United States Patent
Alla et al.

(10) Patent No.: US 10,489,805 B2
(45) Date of Patent: Nov. 26, 2019

(54) METHODS AND APPARATUS TO MONITOR MEDIA PRESENTATIONS

(71) Applicant: The Nielsen Company (US), LLC, New York, NY (US)

(72) Inventors: Madhusudhan Reddy Alla, Allen, TX (US); Arun Ramaswamy, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 284 days.

(21) Appl. No.: 15/636,203

(22) Filed: Jun. 28, 2017

(65) Prior Publication Data

US 2017/0300947 A1  Oct. 19, 2017

Related U.S. Application Data

(63) Continuation of application No. 13/963,737, filed on Aug. 9, 2013, now Pat. No. 9,697,533.
(Continued)

(51) Int. Cl.
*G06Q 30/02* (2012.01)
*G06F 16/245* (2019.01)
(Continued)

(52) U.S. Cl.
CPC .......... *G06Q 30/0204* (2013.01); *G06F 8/61* (2013.01); *G06F 16/245* (2019.01);
(Continued)

(58) Field of Classification Search
CPC .......... G06Q 30/0204; G06Q 30/0241; G06Q 30/0246; G06F 16/245; G06F 16/285; G06F 8/61; H04N 21/251; H04N 21/258
(Continued)

(56) References Cited

U.S. PATENT DOCUMENTS 4,905,080 A * 2/1990 Watanabe .............. G06Q 30/02
                                                              725/14
5,377,269 A   12/1994 Heptig et al.
(Continued)

FOREIGN PATENT DOCUMENTS

AU     2013205736     5/2013
CA     2712961        2/2011
(Continued)

OTHER PUBLICATIONS

Whiting, Seth W., et al., "Creating an IPhone Application for Collecting Continuous ABC Data", Journal of Applied Behavior Analysis, vol. 45, No. 3, Fall 2012, pp. 643-656.
(Continued)

*Primary Examiner* — Robert Stevens
(74) *Attorney, Agent, or Firm* — Hanley, Flight & Zimmerman, LLC

(57) ABSTRACT

Methods, apparatus, systems and articles of manufacture to monitor media are disclosed. An example method includes installing a monitoring enabled application on a media device. Configuration information to instruct the monitoring enabled application to enable monitoring functionality is accessed. A media presentation event is identified within the monitoring enabled application. A media identifier corresponding to the media presentation event when the monitoring functionality is enabled is determined. At least one of a user identifier or a device identifier associated with the media device is determined when the monitoring functionality is enabled. A record is transmitted including the media identifier and the at least one of the user identifier or the device identifier to the audience measurement entity when the monitoring functionality is enabled.

20 Claims, 8 Drawing Sheets

Related U.S. Application Data

(60) Provisional application No. 61/813,019, filed on Apr. 17, 2013.

(51) Int. Cl.
*G06F 16/28* (2019.01)
*G06F 8/61* (2018.01)
*H04N 21/25* (2011.01)
*H04N 21/258* (2011.01)

(52) U.S. Cl.
CPC ....... *G06F 16/285* (2019.01); *G06Q 30/0241* (2013.01); *H04N 21/251* (2013.01); *H04N 21/25883* (2013.01); *G06Q 30/0246* (2013.01)

(58) Field of Classification Search
USPC ........................................................ 707/732
See application file for complete search history.

(56) References Cited

U.S. PATENT DOCUMENTS

| | | |
|---|---|---|
| 5,675,510 A | 10/1997 | Coffey et al. |
| 5,796,952 A | 8/1998 | Davis et al. |
| 5,848,396 A | 12/1998 | Gerace |
| 5,948,061 A | 9/1999 | Merriman et al. |
| 6,052,730 A | 4/2000 | Felciano et al. |
| 6,098,093 A | 8/2000 | Bayeh et al. |
| 6,102,406 A | 8/2000 | Miles et al. |
| 6,108,637 A | 8/2000 | Blumenau |
| 6,138,155 A | 10/2000 | Davis et al. |
| 6,223,215 B1 | 4/2001 | Hunt et al. |
| 6,286,140 B1 | 9/2001 | Ivanyi |
| 6,415,323 B1 | 7/2002 | McCanne et al. |
| 6,434,614 B1 | 8/2002 | Blumenau |
| 6,457,010 B1 | 9/2002 | Eldering et al. |
| 6,460,079 B1 | 10/2002 | Blumenau |
| 6,529,952 B1 | 3/2003 | Blumenau |
| 6,606,657 B1 | 8/2003 | Zilberstein et al. |
| 6,658,410 B1 | 12/2003 | Sakamaki et al. |
| 6,839,680 B1 | 1/2005 | Liu et al. |
| 7,039,699 B1 | 5/2006 | Narin et al. |
| 7,092,926 B2 | 8/2006 | Cerrato |
| 7,127,305 B1 | 10/2006 | Palmon |
| 7,139,723 B2 | 11/2006 | Conkwright et al. |
| 7,146,329 B2 | 12/2006 | Conkwright et al. |
| 7,150,030 B1 | 12/2006 | Eldering et al. |
| 7,159,023 B2 | 1/2007 | Tufts |
| 7,181,412 B1 | 2/2007 | Fulgoni et al. |
| 7,260,837 B2 | 8/2007 | Abraham et al. |
| 7,323,991 B1 | 1/2008 | Eckert et al. |
| 7,343,417 B2 | 3/2008 | Baum |
| 7,363,643 B2 * | 4/2008 | Drake ............... H04N 7/17318 348/E5.002 |
| 7,386,473 B2 | 6/2008 | Blumenau |
| 7,406,516 B2 | 7/2008 | Davis et al. |
| 7,444,388 B1 | 10/2008 | Svendsen |
| 7,546,370 B1 | 6/2009 | Acharya et al. |
| 7,590,568 B2 | 9/2009 | Blumenau |
| 7,593,576 B2 | 9/2009 | Meyer |
| 7,600,014 B2 | 10/2009 | Russell et al. |
| 7,613,635 B2 | 11/2009 | Blumenau |
| 7,634,786 B2 | 12/2009 | Knee |
| 7,644,156 B2 | 1/2010 | Blumenau |
| 7,647,418 B2 | 1/2010 | Ash et al. |
| 7,650,407 B2 | 1/2010 | Blumenau |
| 7,653,724 B2 | 1/2010 | Blumenau |
| 7,716,326 B2 | 5/2010 | Blumenau |
| 7,720,963 B2 | 5/2010 | Blumenau |
| 7,720,964 B2 | 5/2010 | Blumenau |
| 7,756,974 B2 | 7/2010 | Blumenau |
| 7,788,216 B2 | 8/2010 | Li et al. |
| 7,890,451 B2 | 2/2011 | Cancel et al. |
| 7,925,694 B2 | 4/2011 | Harris |
| 7,941,525 B1 | 5/2011 | Yavilevich |
| 7,949,565 B1 | 5/2011 | Eldering et al. |
| 7,958,234 B2 | 6/2011 | Thomas et al. |
| 7,962,603 B1 | 6/2011 | Morimoto |
| 8,006,259 B2 | 8/2011 | Drake |
| 8,032,626 B1 | 10/2011 | Russell et al. |
| 8,046,255 B2 | 10/2011 | Bistriceanu et al. |
| 8,060,601 B1 | 11/2011 | Brown et al. |
| 8,117,193 B2 | 2/2012 | Svendsen et al. |
| 8,131,861 B2 | 3/2012 | Butler et al. |
| 8,180,112 B2 | 5/2012 | Kurtz et al. |
| 8,229,780 B2 | 7/2012 | Davidow et al. |
| 8,234,408 B2 | 7/2012 | Jungck |
| 8,266,687 B2 | 9/2012 | Baldry |
| 8,271,886 B2 | 9/2012 | Lee et al. |
| 8,280,683 B2 | 10/2012 | Finkler |
| 8,302,120 B2 | 10/2012 | Ramaswamy |
| 8,307,006 B2 | 11/2012 | Hannan et al. |
| 8,370,489 B2 | 2/2013 | Mazumdar et al. |
| 8,387,084 B1 | 2/2013 | Klappert et al. |
| 8,484,511 B2 | 7/2013 | Tidwell et al. |
| 8,495,198 B2 | 7/2013 | Sim et al. |
| 8,504,411 B1 | 8/2013 | Subasic et al. |
| 8,549,552 B2 | 10/2013 | Ramaswamy et al. |
| 8,600,796 B1 | 12/2013 | Sterne et al. |
| 8,631,122 B2 | 1/2014 | Kadam et al. |
| 8,688,524 B1 | 4/2014 | Ramalingam et al. |
| 8,700,457 B2 | 4/2014 | Craft |
| 8,713,168 B2 | 4/2014 | Heffernan et al. |
| 8,751,461 B2 | 6/2014 | Abraham et al. |
| 8,831,362 B1 | 9/2014 | Steffens |
| 8,843,626 B2 | 9/2014 | Mazumdar et al. |
| 8,909,771 B2 | 12/2014 | Heath |
| 8,910,195 B1 | 12/2014 | Barney et al. |
| 8,930,701 B2 | 1/2015 | Burbank et al. |
| 8,954,536 B2 | 2/2015 | Kalus et al. |
| 8,973,023 B1 | 3/2015 | Rao et al. |
| 9,055,122 B2 | 6/2015 | Grecco et al. |
| 9,117,217 B2 | 8/2015 | Wilson et al. |
| 9,210,130 B2 | 12/2015 | Burbank et al. |
| 9,697,533 B2 | 7/2017 | Alla et al. |
| 2002/0099609 A1 | 7/2002 | Nascenzi et al. |
| 2003/0006911 A1 | 1/2003 | Smith et al. |
| 2003/0037131 A1 | 2/2003 | Verma |
| 2003/0046385 A1 | 3/2003 | Vincent |
| 2003/0065770 A1 | 4/2003 | Davis et al. |
| 2003/0177488 A1 | 9/2003 | Smith et al. |
| 2003/0220901 A1 | 11/2003 | Carr et al. |
| 2004/0088212 A1 | 5/2004 | Hill |
| 2004/0107125 A1 | 6/2004 | Guheen |
| 2005/0166233 A1 | 7/2005 | Beyda et al. |
| 2005/0223093 A1 | 10/2005 | Hanson et al. |
| 2006/0089754 A1 | 4/2006 | Mortenson |
| 2006/0178996 A1 | 8/2006 | Matsushima et al. |
| 2006/0184617 A1 | 8/2006 | Nicholas et al. |
| 2006/0190616 A1 | 8/2006 | Mayerhofer et al. |
| 2006/0271641 A1 | 11/2006 | Stavrakos et al. |
| 2007/0043769 A1 | 2/2007 | Kasahara et al. |
| 2007/0106787 A1 | 5/2007 | Blumenau |
| 2007/0106792 A1 | 5/2007 | Blumenau |
| 2007/0156532 A1 | 7/2007 | Nyhan et al. |
| 2007/0198327 A1 | 8/2007 | Yazdani et al. |
| 2007/0208711 A1 | 9/2007 | Rhoads et al. |
| 2007/0271580 A1 | 11/2007 | Tischer |
| 2008/0004958 A1 | 1/2008 | Ralph et al. |
| 2008/0086356 A1 | 4/2008 | Glassman et al. |
| 2008/0091762 A1 * | 4/2008 | Neuhauser ............ G06Q 10/00 709/201 |
| 2008/0126420 A1 | 5/2008 | Wright et al. |
| 2008/0201472 A1 | 8/2008 | Bistriceanu et al. |
| 2008/0235243 A1 | 9/2008 | Lee et al. |
| 2008/0248815 A1 | 10/2008 | Busch |
| 2008/0276179 A1 | 11/2008 | Borenstein et al. |
| 2009/0030780 A1 | 1/2009 | York |
| 2009/0055241 A1 | 2/2009 | Chen et al. |
| 2009/0070443 A1 | 3/2009 | Vanderhook et al. |
| 2009/0076899 A1 | 3/2009 | Gbodimowo |
| 2009/0125934 A1 | 5/2009 | Jones |
| 2009/0171762 A1 | 7/2009 | Alkove et al. |
| 2009/0217315 A1 | 8/2009 | Malik et al. |
| 2009/0254633 A1 | 10/2009 | Olive |

(56) References Cited

U.S. PATENT DOCUMENTS

| | | |
|---|---|---|
| 2009/0307084 A1 | 12/2009 | Monighetti et al. |
| 2009/0327026 A1 | 12/2009 | Bistriceanu et al. |
| 2010/0004977 A1 | 1/2010 | Marci et al. |
| 2010/0010866 A1 | 1/2010 | Bal et al. |
| 2010/0070621 A1 | 3/2010 | Urdan et al. |
| 2010/0076814 A1 | 3/2010 | Manning |
| 2010/0088152 A1 | 4/2010 | Bennett |
| 2010/0088373 A1 | 4/2010 | Pinkham |
| 2010/0114739 A1 | 5/2010 | Johnston |
| 2010/0121676 A1 | 5/2010 | Jackson |
| 2010/0153175 A1 | 6/2010 | Pearson |
| 2010/0153207 A1 | 6/2010 | Roberts |
| 2010/0153544 A1 | 6/2010 | Krassner et al. |
| 2010/0161385 A1 | 6/2010 | Karypis et al. |
| 2010/0191723 A1 | 7/2010 | Perez et al. |
| 2010/0205057 A1 | 8/2010 | Hook et al. |
| 2010/0241745 A1 | 9/2010 | Offen et al. |
| 2010/0262498 A1 | 10/2010 | Nolet et al. |
| 2010/0268540 A1 | 10/2010 | Arshi et al. |
| 2010/0268573 A1 | 10/2010 | Jain et al. |
| 2010/0299604 A1 | 11/2010 | Blumenau |
| 2010/0312854 A1 | 12/2010 | Hyman |
| 2010/0313009 A1 | 12/2010 | Combet et al. |
| 2010/0325051 A1 | 12/2010 | Etchegoyen |
| 2011/0016482 A1 | 1/2011 | Tidwell et al. |
| 2011/0041062 A1 | 2/2011 | Singer et al. |
| 2011/0093327 A1 | 4/2011 | Fordyce, III et al. |
| 2011/0106620 A1 | 5/2011 | Setiawan et al. |
| 2011/0126222 A1* | 5/2011 | Wright ............... G06Q 30/02 725/14 |
| 2011/0131596 A1 | 6/2011 | Amsterdam et al. |
| 2011/0137733 A1 | 6/2011 | Baird et al. |
| 2011/0153391 A1 | 6/2011 | Tenbrock |
| 2011/0191664 A1 | 8/2011 | Sheleheda et al. |
| 2011/0191831 A1 | 8/2011 | Chan et al. |
| 2011/0196735 A1 | 8/2011 | von Sydow et al. |
| 2011/0208860 A1 | 8/2011 | Sim et al. |
| 2011/0231240 A1 | 9/2011 | Schoen et al. |
| 2011/0238520 A1 | 9/2011 | Selley |
| 2011/0246297 A1 | 10/2011 | Buchalter et al. |
| 2011/0246641 A1 | 10/2011 | Pugh et al. |
| 2011/0282730 A1 | 11/2011 | Tarmas |
| 2011/0288907 A1 | 11/2011 | Harvey et al. |
| 2012/0005213 A1 | 1/2012 | Hannan et al. |
| 2012/0011528 A1* | 1/2012 | Nielsen ............... H04H 60/31 725/12 |
| 2012/0030037 A1 | 2/2012 | Carriero |
| 2012/0042005 A1 | 2/2012 | Papakostas et al. |
| 2012/0072469 A1 | 3/2012 | Perez et al. |
| 2012/0109709 A1 | 5/2012 | Fordyce, III et al. |
| 2012/0109882 A1 | 5/2012 | Bouse et al. |
| 2012/0110027 A1 | 5/2012 | Falcon |
| 2012/0110071 A1 | 5/2012 | Zhou et al. |
| 2012/0143713 A1 | 6/2012 | Dittus et al. |
| 2012/0151079 A1 | 6/2012 | Besehanic et al. |
| 2012/0151322 A1 | 6/2012 | Lindsay et al. |
| 2012/0158490 A1 | 6/2012 | Neumeyer et al. |
| 2012/0158954 A1 | 6/2012 | Heffernan |
| 2012/0166520 A1 | 6/2012 | Lindsay et al. |
| 2012/0173701 A1 | 7/2012 | Tenbrock |
| 2012/0192214 A1 | 7/2012 | Hunn et al. |
| 2012/0206331 A1 | 8/2012 | Gandhi |
| 2012/0209920 A1 | 8/2012 | Neystadt et al. |
| 2012/0215621 A1 | 8/2012 | Heffernan |
| 2012/0221559 A1 | 8/2012 | Kidron |
| 2012/0239407 A1 | 9/2012 | Lynch et al. |
| 2012/0239809 A1 | 9/2012 | Mazumdar et al. |
| 2012/0254466 A1 | 10/2012 | Jungck |
| 2012/0302222 A1 | 11/2012 | Williamson et al. |
| 2012/0310729 A1 | 12/2012 | Dalto et al. |
| 2012/0311017 A1 | 12/2012 | Sze et al. |
| 2012/0331498 A1 | 12/2012 | Houston |
| 2013/0007794 A1 | 1/2013 | Besehanic et al. |
| 2013/0014144 A1 | 1/2013 | Bhatia |
| 2013/0014223 A1 | 1/2013 | Bhatia et al. |
| 2013/0019262 A1 | 1/2013 | Bhatia |
| 2013/0060629 A1 | 3/2013 | Rangsikitpho et al. |
| 2013/0080263 A1 | 3/2013 | Goldman et al. |
| 2013/0080268 A1 | 3/2013 | Gordon et al. |
| 2013/0097311 A1 | 4/2013 | Mazumdar et al. |
| 2013/0097312 A1 | 4/2013 | Mazumdar et al. |
| 2013/0117103 A1 | 5/2013 | Shimizu et al. |
| 2013/0124628 A1 | 5/2013 | Weerasinghe |
| 2013/0138506 A1 | 5/2013 | Zhu et al. |
| 2013/0145022 A1 | 6/2013 | Srivastava et al. |
| 2013/0159499 A1 | 6/2013 | Besehanic |
| 2013/0198125 A1 | 8/2013 | Oliver et al. |
| 2013/0198383 A1 | 8/2013 | Tseng et al. |
| 2013/0212188 A1 | 8/2013 | Duterque et al. |
| 2013/0246389 A1 | 9/2013 | Osann, Jr. |
| 2013/0246609 A1 | 9/2013 | Topchy et al. |
| 2013/0254897 A1 | 9/2013 | Reedy et al. |
| 2013/0282898 A1 | 10/2013 | Kalus et al. |
| 2013/0290070 A1 | 10/2013 | Abraham et al. |
| 2013/0297411 A1 | 11/2013 | van Datta et al. |
| 2013/0297467 A1 | 11/2013 | Kidron |
| 2013/0325588 A1 | 12/2013 | Kalyanam et al. |
| 2013/0332604 A1 | 12/2013 | Seth et al. |
| 2014/0033317 A1 | 1/2014 | Barber |
| 2014/0040171 A1 | 2/2014 | Segaloy et al. |
| 2014/0075004 A1 | 3/2014 | Van Dusen et al. |
| 2014/0123253 A1 | 5/2014 | Davis et al. |
| 2014/0156761 A1 | 6/2014 | Heffernan et al. |
| 2014/0173746 A1 | 6/2014 | Armstrong-Muntner et al. |
| 2014/0279074 A1 | 9/2014 | Chen et al. |
| 2014/0280896 A1 | 9/2014 | Papakostas et al. |
| 2014/0298025 A1 | 10/2014 | Burbank et al. |
| 2014/0324544 A1 | 10/2014 | Donato et al. |
| 2014/0324545 A1 | 10/2014 | Splaine et al. |
| 2014/0337104 A1 | 11/2014 | Splaine et al. |
| 2015/0019322 A1 | 1/2015 | Alla et al. |
| 2015/0019327 A1 | 1/2015 | Mazumdar et al. |
| 2015/0046248 A1 | 2/2015 | Ben-Yaacov et al. |
| 2015/0046579 A1 | 2/2015 | Perez et al. |
| 2015/0070585 A1 | 3/2015 | Sharif-Ahmadi et al. |
| 2015/0193816 A1 | 7/2015 | Toupet et al. |
| 2015/0262207 A1 | 9/2015 | Rao et al. |

FOREIGN PATENT DOCUMENTS

| | | |
|---|---|---|
| EP | 703683 | 3/1996 |
| EP | 744695 | 11/1996 |
| GB | 2176639 | 12/1986 |
| JP | H05324352 | 12/1993 |
| JP | 2002163562 | 6/2002 |
| JP | 2006127320 | 5/2006 |
| JP | 2006127321 | 5/2006 |
| JP | 2010282319 | 12/2010 |
| KR | 20100094021 | 8/2010 |
| KR | 20110023293 | 3/2011 |
| WO | 9600950 | 1/1996 |
| WO | 9617467 | 6/1996 |
| WO | 9628904 | 9/1996 |
| WO | 9632815 | 10/1996 |
| WO | 9637983 | 11/1996 |
| WO | 9641495 | 12/1996 |
| WO | 152168 | 7/2001 |
| WO | 2011097624 | 8/2011 |
| WO | 2012040371 | 3/2012 |
| WO | 2012087954 | 6/2012 |
| WO | 2012128895 | 9/2012 |
| WO | 2012177866 | 12/2012 |
| WO | 2013122907 | 8/2013 |
| WO | 2014172472 | 10/2014 |

OTHER PUBLICATIONS

Liu, Zimu, et al., "Socialize Spontaneously with Mobile Applications", INFOCOM 2012, Orlando, FL, Mar. 25-30, 2012, pp. 1942-1950.

"ID3", Wikipedia, downloaded from: en.wikipedia.org/wiki/ID3 on Apr. 16, 2015, 15 pages.

(56) References Cited

OTHER PUBLICATIONS

"Software development kit", Wikipedia, downloaded from: en.wikipedia.org/wiki/Software-development-kit on Apr. 16, 2015, 2 pages.
Evensen, Pål, et al., "AdScorer: An Event-Based System for Near Real-Time Impact Analysis of Television Advertisements", DEBS '12, Berlin, Germany, Jul. 16-20, 2012, pp. 85-94.
Dhillon, Jaspaljeet Singh, et al., "Leveraging Consumer Sensing Devices for Television", CHINZ '12, Dunedin, New Zealand, Jul. 2-3, 2012, pp. 29-35.
Buyya, Rajkumar, et al., "Cloudbus Toolkit for Market-Oriented Computing", CloudCom 2009, LNCS 5931, Springer-Verlag, Berlin, Germany, © 2009, pp. 24-44.
International Searching Authority, "International Search Report and Written Opinion", issued in connection with International Patent Application No. PCT/US2014/034389, dated Sep. 5, 2014 (15 pages).
IP Australia, "Examination Report", issued in connection with Australian Patent Application No. 2014254014, dated Jun. 17, 2015 (3 pages).
Coffey, "Internet Audience Measurement: A Practitioner's View," Journal of Interactive Advertising, vol. 1, No. 2, Spring 2001 (pp. 10-17).
Fliptop, "Fliptop Person API Documentation," https://developer.fliptop.com/documentation, retrieved on May 7, 2013 (6 pages).
Fliptop, "Get, Keep and Grow Customers with Fliptop's Customer Intelligence Application," www.fliptop.com/feature#social-matching, retrieved on May 7, 2013 (3 pages).
Fliptop, "What is Fliptop?," www.fliptop.com/about-us, retrieved on May 7, 2013 (1 page).
Rapleaf, "Fast. Simple. Secure," www.rapleaf.com/why-rapleaf/, retrieved on May 7, 2013 (3 pages).
Rapleaf, "Frequently Asked Questions," www.rapleaf.com/under-the-hood/, retrieved on May 7, 2013 (3 pages).
Rapleaf, "The Consumer Data Marketplace," www.rapleaf.com/under-the-hood/, retrieved on May 7, 2013 (2 pages).
Rainier, "Why Businesses Should Use Google Plus," The Social Media Guide, thesocialmediaguide.com/social-media/why-businesses-should-use-google-plus, retrieved on May 7, 2013 (9 pages).
Vega, "Nielsen Introduces New Ad Measurement Product," The New York Times, Sep. 27, 2010 (7 pages).
Launder, "Media Journal: Nielsen to Test Online-TV Viewing Tool," The Wall Street Journal, Apr. 30, 2013 (2 pages).
Sharma, "Nielsen Gets Digital to Track Online TV Viewers," All Things, Apr. 30, 2013 (3 pages).
Chloe Albanesius, "Facebook Issues Fix for Several Tracking Cookies," Internet article, www.pcmag.com, Sep. 28, 2011 (2 pages).
Emil Protalinski, "Facebook denies cookie tracking allegations," Internet article, www.zdnet.com, Sep. 25, 2011 (2 pages).
Emil Protalinski, "Facebook fixes cookie behavior after logging out," Internet article, www.zdnet.com, Sep. 27, 2011 (2 pages).
Nik Cubrilovic, "Logging out of Facebook is not enough," Internet article, www.nikcub.appspot.com, Sep. 25, 2011 (3 pages).
Emil Protalinksi, "US congressmen ask FTC to investigate Facebook cookies," Internet article, retrieved from http://www.zdnet.com/blog/facebook/us-congressmen-ask-ftc-to-investigate-facebook-cookies/4218, Sep. 28, 2011 (2 pages).
Webmaster World, "JavaScript and AJAX Forum", Sep. 28, 2005, [retrieved from Internet at http://www.webmasterworld.com/forum91/4465.htm on Jun. 29, 2011] (4 pages).
Vranica, "Nielsen Testing a New Web-Ad Metric," The Wall Street Journal, Sep. 23, 2010 (2 pages).
Wikipedia, "Mental Poker," Jan. 12, 2010, [retrieved from Internet at http://en.wikipedia.org/wiki/Mental-poker on Sep. 21, 2010] (5 pages).
The Nielsen Company, "Nielsen Unveils New Online Advertising Measurement," Sep. 27, 2010, [retrieved from Internet at http://nielsen.com/us/en/insights/press-room/2010/nielsen-unveils-newonlineadvertisingmeasurement.html on May 31, 2012] (3 pages).
International Searching Authority, "International Search Report," issued in connection with International Patent Application No. PCT/US2013/057045, dated Dec. 27, 2013 (3 pages).
International Searching Authority, "Written Opinion of the International Searching Authority," issued in connection with International Patent Application No. PCT/US2013/057045, dated Dec. 27, 2013 (5 pages).
United States Patent and Trademark Office, "Notice of Allowance," issued in connection with U.S. Appl. No. 14/127,414, dated Oct. 17, 2014 (7 pages).
United States Patent and Trademark Office, "Supplemental Notice of Allowability," issued in connection with U.S. Appl. No. 14/127,414, dated Nov. 17, 2014 (4 pages).
Australian Government, IP Australia, "Patent Examination Report No. 1," issued in connection with Australian Application No. 2013204953, dated Dec. 23, 2014 (5 pages).
Japanese Patent Office, "Notice of Reasons for Rejection," issued in connection with Japanese Patent Application No. P2015-524512 dated Jun. 30, 2015 (6 pages).
Canadian Intellectual Property Office, "Examination Search Report," issued in connection with Application No. 2,873,128, dated Jan. 7, 2015, (3 pages).
United States Patent and Trademark Office, "Non-Final Office Action," issued in connection with U.S. Appl. No. 14/025,567, dated Dec. 11, 2015, (28 pages).
The State Intellectual Property Office of China, "2nd Office Action," issued in connection with application No. 201280003504.8, dated Nov. 30, 2015, (9 pages).
International Searching Authority, "International Preliminary Report on Patentability," issued by the International Searching Authority in connection with PCT application No. PCT/US2013/057045, dated Mar. 3, 2015. (1 page).
International Searching Authority, "Written Opinion of the International Searching Authority," issued by the International Searching Authority in connection with PCT application No. OCT/US2013/057045, dated Mar. 3, 2015 (5 pages).
European Patent Office, "Communication pursuant to Rules 161(2) and 162 EPC," issued in connection with Application No. 14785108.3, dated Nov. 24, 2015, (2 pages).
International Bureau, "Notification Concerning Transmittal of International Preliminary Report on Patentability," issued in connection with PCT application Serial No. PCT/US2014/034389, dated Oct. 29, 2015, (1 pages).
International Bureau, "International Preliminary Report on Patentability," issued in connection with PCT application Serial No. PCT/US2014/034389, dated Oct. 20, 2015, (10 pages).
European Patent Office, "Communication pursuant to Rules 161(2) and 162 EPC", issued in connection with European Patent Application No. 14785108.3, dated Nov. 27, 2015, (2 pages).
Australian Government, IP Australia, "Notice of Grant," issued in connection with Australian Application No. 2014254014, dated Sep. 29, 2016 (1 page).
European Patent Office, "Extended European Search Report", issued in connection with European Patent Application No. 14785108.3, dated Oct. 14, 2016, (7 pages).
Japanese Patent Office, "Notice of Reasons for Rejection," issued in connection with Japanese Patent Application No. P2015-525656 dated Oct. 4, 2016 (8 pages).
Korean Patent Office, "Notice of Preliminary Rejection," issued in connection with Korean Patent Application No. 10-2014-7034045 dated Mar. 22, 2016 (7 pages).
United States Patent and Trademark Office, "Non-Final Office Action," issued in connection with U.S. Appl. No. 13/963,737, dated Apr. 27, 2015, 15 pages.
United States Patent and Trademark Office, "Final Office Action," issued in connection with U.S. Appl. No. 13/963,737, dated Sep. 21, 2015, 15 pages.
United States Patent and Trademark Office, "Non-Final Office Action," issued in connection with U.S. Appl. No. 13/963,737, dated May 17, 2016, 16 pages.
United States Patent and Trademark Office, "Notice of Allowance," issued in connection with U.S. Appl. No. 13/963,737, dated Nov. 4, 2016, 8 pages.

(56) References Cited

OTHER PUBLICATIONS

United States Patent and Trademark Office, "Notice of Allowance," issued in connection with U.S. Appl. No. 13/963,737, dated Feb. 27, 2017, 8 pages.
IP Australia, "Examination report No. 1 for standard patent application," issued in connection with Australian Patent Application No. 2016219677, dated Sep. 18, 2017, 5 pages.
IP Australia, "Examination report No. 2 for standard patent application," issued in connection with Australian Patent Application No. 2016219677, dated Feb. 12, 2018, 3 pages.
IP Australia, "Examination report No. 3 for standard patent application," issued in connection with Australian Patent Application No. 2016219677, dated May 16, 2018, 4 pages.
Canadian Intellectual Property Office, "Office Action," issued in connection with Canadian Patent Application No. 2875429, dated Dec. 4, 2015, 3 pages.
Canadian Intellectual Property Office, "Office Action," issued in connection with Canadian Patent Application No. 2875429, dated Dec. 13, 2016, 5 pages.
Canadian Intellectual Property Office, "Office Action," issued in connection with Canadian Patent Application No. 2875429, dated Nov. 15, 2017, 1 pages.
State Intellectual Property Office of China, "Notice of Allowance," issued in connection with Chinese Patent Application No. 201480001434.1, dated Mar. 5, 2018, 5 pages. (with translation).
State Intellectual Property Office of China, "Office Action," issued in connection with Chinese Patent Application No. 201480001434.1, dated Feb. 22, 2017, 9 pages.
State Intellectual Property Office of China, "Office Action," issued in connection with Chinese Patent Application No. 201480001434.1, dated Aug. 11, 2017, 8 pages.
Japanese Patent Office, "Notice of Reasons for Rejection," issued in connection with Japanese Patent Application No. P2015-525656 dated Dec. 1, 2015 (6 pages).
Japanese Patent Office, "Final Rejection," issued in connection with Japanese Patent Application No. P2015-525656 dated Jan. 24, 2017 (6 pages).
Japanese Patent Office, "Notice of Allowance," issued in connection with Japanese Patent Application No. P2015-525656 dated Jun. 14, 2017 (3 pages).
Korean Patent Office, "Notice of Preliminary Rejection," issued in connection with Korean Patent Application No. 10-2014-7034045 dated Oct. 31, 2016 (12 pages).
Intellectual Property India, "Examination Report," dated Jan. 30, 2019 in connection with Indian Patent Application No. 10099/DELNP/2014, 5 pages.
European Patent Office, "Examination Report," dated Mar. 13, 2019 in connection with European Patent Application No. 14785108.3-1217, 7 pages.
IP Australia, "Examination Report," dated Jul. 24, 2019 in connection with Australian Patent Application No. 2018232912, 3 pages.

* cited by examiner

METHODS AND APPARATUS TO MONITOR MEDIA PRESENTATIONS

RELATED APPLICATION

This patent arises from a continuation of U.S. patent application Ser. No. 13/963,737, filed on Aug. 9, 2013, and entitled "METHOD AND APPARATUS TO MONITOR MEDIA PRESENTATIONS", which claims the benefit of U.S. Provisional Patent Application Ser. No. 61/813,019, which is entitled "METHODS AND APPARATUS TO MONITOR MEDIA PRESENTATIONS" and was filed on Apr. 17, 2013. U.S. patent application Ser. No. 13/963,737 and U.S. Provisional Patent Application Ser. No. 61/813,019 are hereby incorporated by reference in their entireties.

FIELD OF THE DISCLOSURE

This disclosure relates generally to monitoring media and, more particularly, to methods and apparatus to monitor media presentations.

BACKGROUND

In recent years, media devices have been provided with Internet connectivity and the ability to retrieve media from the Internet. As such, media exposure has shifted away from conventional methods of presentation, such as broadcast television, towards presentation via consumer devices accessing the Internet to retrieve media for display.

Media providers and/or other entities such as, for example, advertising companies, broadcast networks, etc. are often interested in the viewing, listening, and/or media behavior of audience members and/or the public in general. The media usage and/or exposure habits of audience members as well as demographic data about the audience members is collected and used to statistically determine the size and demographics of an audience of interest.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
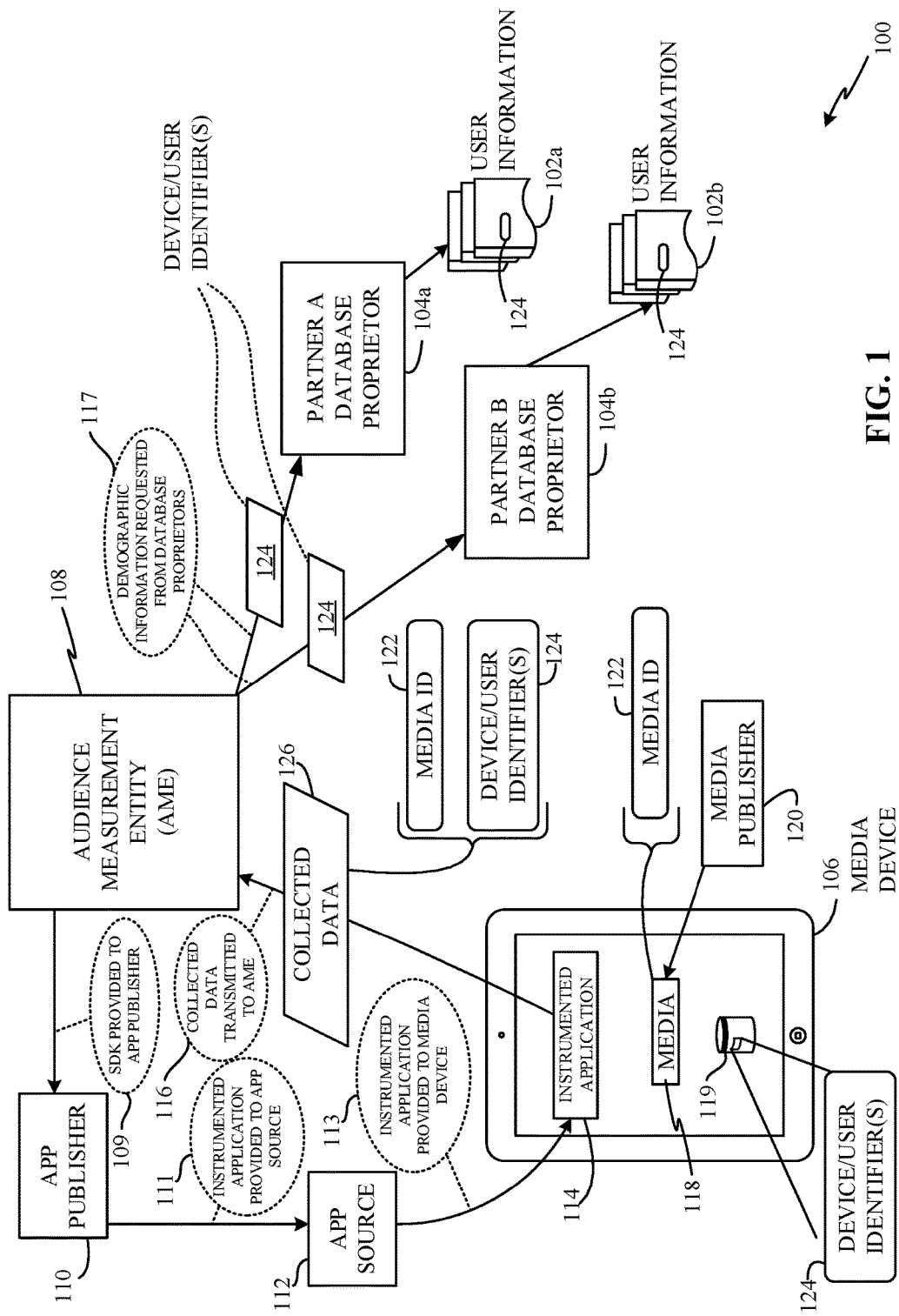
FIG. 1 is a block diagram of an example system constructed in accordance with the teachings of this disclosure to monitor media presentations.

Monitoring companies desire to gain knowledge on how users interact with media devices such as smartphones, tablets, laptops, smart televisions, etc. In particular, the media monitoring companies want to monitor media presentations made at the media devices to, among other things, monitor exposure to advertisements, determine advertisement effectiveness, determine user behavior, identify purchasing behavior associated with various demographics, etc.

As used herein, the term "media" includes any type of content and/or advertisement delivered via any type of distribution medium. Thus, media includes television programming or advertisements, radio programming or advertisements, movies, websites, streaming media, etc. Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation® 3), tablet computers (e.g., an iPad®), digital media players (e.g., AppleTV®, a Roku® media player, a Slingbox®, etc.), etc. In some examples, media monitoring information is aggregated to determine ownership and/or usage statistics of media devices, relative rankings of usage and/or ownership of media devices, types of uses of media devices (e.g., whether a device is used for browsing the Internet, streaming media from the Internet, etc.), and/or other types of media device information. In examples disclosed herein, monitoring information includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or device and/or user-identifying information (e.g., a username, a media access control (MAC) address, an Internet Protocol (IP) address, an Apple ID, a panelist identifier, etc.).

Media devices such as tablet computers (e.g., an Apple iPad®, an Asus Transformer™, etc.) present media using applications (sometimes referred to as "apps") that access, retrieve, request, and/or present media (e.g., Internet media). Many different "apps" exist and can be downloaded by users through app stores such as, for example, Apple iTunes®, Google Play®, etc. Hundreds, if not thousands, of apps are available in the app stores that enable presentation of media. In some examples, "apps" can be downloaded and/or installed from a location other than an app store such as, for example, a website, a memory device (e.g., an SD card, a CD-ROM, etc.). Examples of such applications include, but are not limited to, Hulu®, Netflix®, HBO Go®, etc.

Operating systems used on media devices are often closed platforms. That is, the operating systems provide a limited set of functions that applications executed by the media device can access via, for example, an Application Programming Interface (API). In some examples, apps have access to a limited set of functionality for sharing data with other apps and/or retrieving information from the operating system of the media device. For example, applications may have access to a username used on the device (e.g., an Apple ID), applications may have access to a device identifier (e.g., a MAC address), etc.

Traditionally, audience measurement entities (also referred to herein as "ratings entities") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposure to those panelists and different demographic markets. The audience measurement entity then sets and/or retrieves a user and/or device identifier so that subsequent impressions related to the panelist can be associated with the panelist and/or the demographics of the panelist. In exchange for providing detailed demographic information, panelists are sometimes provided with incentives (e.g., apps, gift cards, cash, entry into a raffle and/or drawing, etc.). Accordingly, having a large panel can sometimes become cost prohibitive.

Use of panelist identifiers and/or demographic information associated with individual panelists is sometimes referred to as panelist style measurement. In examples disclosed herein, panelist style measurement refers to measuring and/or monitoring a group of users smaller than, but representative of, a larger population of users. For example, a panel may include ten thousand users, while the entirety of users may be one million. Records received in association with the ten thousand panelists are extrapolated to form a projected representation of the entirety of users. For example, if the panel of ten thousand panelists resulted in five hundred measured exposures to a particular media, extrapolation may identify that for one million users there were fifty thousand exposures to the particular media.

Unlike traditional techniques in which audience measurement entities rely solely on their own panel member data to collect demographics-based audience measurement, example methods, apparatus, and/or articles of manufacture disclosed herein enable an audience measurement entity to request demographic information from other entities that operate based on user registration models. In some examples, data collected using a user registration model is referred to as census style measurement because the database involved is so large. In examples disclosed herein, census style measurement refers to the measurement of all or substantially all of the users. In examples disclosed herein, collection of records (e.g., records of media exposure) in association with all or substantially all users reduces and/or eliminates the need to perform any extrapolation to represent all users and/or user activity.

As used herein, a user registration model is a model in which users subscribe to services of those entities by creating an account and providing demographic-related information about themselves. Sharing of demographic information associated with registered users of database proprietors enables an audience measurement entity to extend or supplement their panel data with substantially reliable demographics information from external sources (e.g., database proprietors), thus extending the coverage, accuracy, and/or completeness of their demographics-based audience measurements. Such access also enables the audience measurement entity to monitor persons who would not otherwise have joined an audience measurement panel.

Any entity having a database identifying demographics of a set of individuals may cooperate with the audience measurement entity. Such entities may be referred to as "database proprietors" and include entities such as wireless service carriers, mobile software/service providers, social networking sites (e.g., Facebook, Twitter, LinkedIn, Google, etc.), online retailer sites (e.g., Amazon.com, Buy.com, etc.), and/or any other Internet site that maintains user registration records (e.g., Yahoo!, MSN, Apple iTunes, Experian, etc.) There are many database proprietors operating on the Internet. These database proprietors provide services to large numbers of subscribers. In exchange for the provision of the service, the subscribers register with the proprietor. As part of this registration, the subscribers provide detailed demographic information. The database proprietors, as part of the use of an application of the database proprietor (e.g., a Facebook app, a twitter app, etc.) have access to and/or collect the user and/or device identifier from the media device.

In contrast to demographic information received when enrolling panelists (where a panelist is aware of their sharing of demographic information with the audience measurement entity), demographic information retrieved from a database proprietor also comes with data privacy concerns (because users may be unaware of the sharing of such information). To that end, users may approve or prevent the sharing of demographic information on the part of the database proprietor. Further, to protect the identities of individuals, demographic information may, in some examples, be provided in the aggregate. For example, demographic information may only be returned when one hundred or more user and/or device identifiers are provided to the database proprietor. As described herein, users and/or application publishers may select whether their demographic information may be collected from database proprietors individually and/or in the aggregate.

In further contrast to demographic information received when enrolling panelists (where the panelist is requested to provide very detailed demographic information to the audience measurement entity), the demographic information collected by the database proprietor may not be very detailed. For example, the database proprietor might not request demographic information related to the user's income, the user's interests, the user's race, etc. Furthermore, different database proprietors may request and/or store different information from the user. For example, a social media database proprietor may store demographic information related to user's race, interests, location, etc. while a credit reporting database proprietor may store demographic information related to a user's financial information (e.g., income, credit score, etc.).

In some examples, to increase the likelihood that measured viewership is accurately attributed to the correct demographics, example methods, apparatus, and/or articles of manufacture disclosed herein use user information located in the audience measurement entity's records (e.g., panelist information) as well as user information located at one or more database proprietors (e.g., web service providers) that maintain records or profiles of users having accounts therewith. The database proprietors also store the user and/or device identifier, thereby enabling demographic information to be queried from the database proprietor based on the user and/or device identifier. In this manner, example methods, apparatus, and/or articles of manufacture disclosed herein may be used to supplement user information maintained by a ratings entity (e.g., an audience measurement company such as The Nielsen Company of Schaumburg, Ill., United States of America), that collects media exposure measurements, demographics, and/or other user information with user information from one or more different database proprietors (e.g., web service providers). To that end, some database proprietors may only provide demographic information concerning users to the ratings entity in the aggregate, whereas others may provide demographic information on an individual basis. A database proprietor provides demographic information on an aggregate basis when demographic information is provided only if such demographic information is requested in association with a threshold number of users. For example, aggregated demographic information may be provided when there are more than one hundred users identified in the request. However, any other threshold amount of users may additionally or alternatively be used. In contrast, demographic information provided on an individual basis is provided when a single user is identified in the request for demographic information. Whether to provide the demographic information to the ratings entity in the aggregate or individually may be determined by the database proprietor for any reason such as, for example, privacy laws in the jurisdiction of the database proprietor, business factors, technical limitations, etc.

The ratings entity may determine which database proprietor to request demographic information from based on which database proprietor(s) provide data in the aggregate versus which database proprietor(s) provide data on an individual basis. In examples where the database proprietor provides data in the aggregate, the ratings entity requests demographic information by supplying a threshold number of user identifiers to the database proprietor. In some examples, the database proprietor may not have information for each of the user identifiers. In some such examples, the database proprietor may indicate which user identifiers are not included in the aggregated demographic information. If the user and/or application publisher associated with that record has granted permission to request demographic information on an individual basis, the ratings entity may then re-request demographic information concerning those user identifiers from another database proprietor. Alternatively, the ratings entity may request the demographic information in the aggregate from another database proprietor that provides demographic information on an aggregate basis.

The use of demographic information from disparate data sources (e.g., demographic information from the panels of an audience measurement company and/or registered user data of web service providers) results in improved reporting effectiveness of metrics for both online and offline advertising campaigns. Example techniques disclosed herein use online registration data to identify demographics of users to track quantities of impressions attributable to those users. As used herein, an impression refers to an exposure to media (e.g., content and/or an advertisement). In Internet advertising, a quantity of impressions or impression count is the total number of times an advertisement or advertisement campaign has been accessed by a web population (e.g., including the number of times accessed as decreased by, for example, pop-up blockers and/or increased by, for example, retrieval from local cache memory). Unique impression counts eliminate duplicate exposures and, thus, only count one exposure per person.

In examples disclosed herein, a software development kit (SDK) is provided to application developers from, for example, an audience measurement entity or other entity. The SDK facilitates instrumenting and/or otherwise enabling applications (e.g., media applications (such as streaming video applications), news applications, browser applications, image applications, social media applications, games, etc.) with monitoring functionalities which are able to collect and transmit monitoring information (e.g., a user and/or device identifier, a media identifier, etc.) to a monitoring entity (e.g., the audience measurement entity). In particular, the application developers create apps that include media monitoring functionality using the SDK. Accordingly, rather than relying on a dedicated monitoring application installed on a panelist computer (e.g., a tablet, a laptop, a smartphone, etc.), instrumented applications disclosed herein are instrumented with monitoring instructions such that the instant apps effectively monitor themselves and/or user interaction(s) with the instrumented apps. In some examples, the instrumented application is referred to as a monitoring enabled application. Because the instrumented applications monitor themselves, the instrumented applications and/or the monitoring functionality provided by the SDK enables the instrumented application to, for example, notify the monitoring entity (e.g., the audience measurement entity) when an app and/or media associated with the app is presented, notify the monitoring entity (e.g., the audience measurement) entity what media and/or app(s) is presented, notify the monitoring entity (e.g., the audience measurement entity) how the apps and/or media is being presented (e.g. via a tablet display, via a television, etc.), notify the monitoring entity (e.g., the audience measurement entity) of a duration of exposure of an app and/or media associated with the app, etc. In some examples, the media monitoring functionality may be triggered by, for example presentation of a media element such as, for example, a video, audio, and image, etc.

Consider, for example, a media application instrumented with monitoring functionality. Assume the instrumented application has been downloaded and/or otherwise installed on a media device (e.g., via purchase in an app store). During operation of the instrumented media application, the media application identifies a user and/or device identifier as well as an identifier of media presented by the media application, and transmits such information to the audience measurement entity.

Since most of the clients providing monitoring information are not panelists and, thus, are unknown to the audience measurement entity (and identified by only the user and/or device identifier), it is advantageous to integrate demographic information retrieved from the database proprietors to more accurately monitor the population of users providing data for the identified media.

Examples disclosed herein leverage the existing databases of database proprietors to collect more extensive demographic data and/or user data for associating with media impressions tracked on devices that execute apps. However, the audience measurement entity is faced with several problems in accomplishing this end. For example, a problem is presented as to how to access the data of the database proprietors without compromising the privacy of the subscribers, the panelists, or the proprietors of the tracked media. Another problem is how to access this data given the technical restrictions imposed by app software platforms of mobile and/or media devices.

Example methods, apparatus and/or articles of manufacture disclosed herein enable tracking media impressions for media presented by apps that execute on media devices (e.g., portable media devices, iOS media devices, etc.). In this manner, a monitoring entity (e.g., an audience measurement entity (AME)) can track media impressions on media devices.

Example methods, apparatus, and articles of manufacture disclosed herein can be used to determine media impressions, content impressions, advertisement impressions, content exposure, and/or advertisement exposure using user information, which is distributed across different databases (e.g., different website owners, service providers, etc.) on the Internet. Not only do example methods, apparatus, and articles of manufacture disclosed herein enable more accurate correlation of Internet media exposure to user (e.g., demographics) information, but they also effectively extend panel sizes and compositions beyond persons participating in the panel of a monitoring entity (e.g., an audience measurement entity and/or a ratings entity) to persons registered in other Internet databases such as the databases of wireless service carriers, mobile software/service providers, social medium sites (e.g., Facebook, Twitter, Google, etc.), and/or any other Internet sites such as Yahoo!, MSN, Apple iTunes, Experian, etc. This extension effectively leverages the media exposure tracking capabilities of a monitoring entity (e.g., the audience measurement entity) and the use of databases of non-AME entities such as social media and/or other websites to create an enormous, demographically accurate panel that results in accurate, reliable measurements of exposures to media such as advertising and/or content (e.g., programming).

Although the following examples refer to an audience measurement entity, any monitoring entity may fill this role. FIG. 1 is a block diagram of an example system constructed in accordance with the teachings of this disclosure to monitor media presentations. In the illustrated example of FIG. 1, to track media impressions on a media device 106, an audience measurement entity (AME) 108 partners with or cooperates with an app publisher 110 to download and install an instrumented application 114 on the media device 106. In the illustrated example, the AME 108 provides (block 109) a software development kit (SDK) to the app publisher 110. The SDK of the example of FIG. 1 is a set of development tools (e.g., libraries (e.g., dynamically linked libraries (DLLs)), application programming interfaces (APIs), instructions, etc.) that enable the app publisher 110 to integrate monitoring functionality into the instrumented application 114. In examples disclosed herein, the monitoring functionality enables identification of a user and/or device identifier 124, as well as identification of a media ID 122 associated with presented media 118. The app publisher 110 of the illustrated example may be a software app developer that develops and distributes apps to media devices and/or a distributor that receives apps from software app developers and distributes the apps to media devices. The app publisher 110 provides (block 111) the instrumented application to an app source 112.

The example app source 112 of the illustrated example of FIG. 1 is an app store such as, for example, the Apple iTunes® app store. In the illustrated example, the app source 112 provides applications (e.g., apps) to users for use on their media device (e.g., media device 106 such as, for example, an iPad®). While in the illustrated example, the example app source 112 is the Apple iTunes® app store, any other app source, app store, and/or repository of applications/apps may additionally or alternatively be used such as, for example, Google Play, the Windows Phone app store, the Ubuntu Software Center, a website, etc.

The example media device 106 of the illustrated example shown in FIG. 1 is a device that retrieves media from a media publisher 120 for presentation. In some examples, the media device 106 is capable of directly presenting media (e.g., via a display) while, in other examples, the media device 106 presents the media on separate media presentation equipment (e.g., speakers, a display, etc.). Thus, as used herein a "media device" may or may not be able to present media without assistance from a second device. Media devices are typically consumer electronics devices. For example, the media device 106 of the illustrated example is a tablet such as an Apple iPad®, and thus, is capable of directly presenting media (e.g., via an integrated display and speakers). While in the illustrated example, a tablet is shown, any other type(s) and/or number(s) of media device(s) may additionally or alternatively be used. For example, Internet-enabled mobile handsets (e.g., a smartphone, an iPod®, etc.), video game consoles (e.g., any generation of Xbox®, PlayStation®, etc.), tablet computers (e.g., an iPad®, a Motorola™ Xoom™, etc.), digital media players (e.g., a Roku® media player, a Slingbox®, a Tivo®, etc.), smart televisions, etc. may additionally or alternatively be used.

Media devices such as the media device 106 of FIG. 1 traditionally include a data store 119 (e.g., a memory) for storing media and/or application executables. The example data store 119 of the illustrated example of FIG. 1 may be any device for storing data such as, for example, flash memory, magnetic media, optical media, etc. In the illustrated example, the data store 119 is random access memory of the media device 106. Furthermore, the data stored in the data store 119 may be in any data format such as, for example, binary data, comma delimited data, tab delimited data, structured query language (SQL) structures, etc. While in the illustrated example the data store 119 is illustrated as a single database, the data store 119 may be implemented by multiple databases, and/or be stored in multiple memory locations of the media device.

In the illustrated example, to download and install the instrumented application 114 on the media device 106, a user of the media device instructs the media device 106 to retrieve the instrumented application 114 from the app source 112. The app source 112 locates the requested instrumented application 114, and transmits (block 113) the instrumented application 114 to the media device 105 for installation. In some examples, the app source 112 and/or media device 106 may first obtain the consent of a user of the media device 106 to participate in a media tracking program before installation of the instrumented application 114. Such consent may confirm that the user is aware of the capabilities of the instrumented application (e.g., access to a user and/or device identifier, the ability to identify media presented within the application, the ability to transmit monitoring information to the audience measurement entity, etc.)

In the illustrated example, the instrumented application 114 is a media application such as, for example Hulu®, Netflix®, HBO Go®, etc. However, any other type of application may additionally or alternatively be instrumented such as, for example, a game (e.g., Angry Birds®, Cut the Rope®, etc.), a social media application (e.g., Facebook, Twitter, etc.), etc. The media device 106 (e.g., via the instrumented application 114 and/or another application of the media device 106) presents media 118 received from a media publisher 120. The media 118 may be an advertisement, video, audio, text, a graphic, a web page, news, educational media, entertainment media, or any other type of media. In the illustrated example, the instrumented application 114 identifies the media 118 by identifying a media ID 122 provided in and/or in association with the media 118. In examples disclosed herein, the media ID 122 is an ID3 tag including media-identifying metadata, source-identifying metadata, etc.

In the illustrated example, the AME 108 provides media monitoring functionality (e.g., via the SDK) to the app publisher 110 for packaging with the instrumented application 114. In some examples, the app publisher 110 provides the media monitoring functionality as a program separate from the instrumented application 114. In other examples, the app publisher 110 compiles or otherwise includes the media monitoring functionality in the instrumented application 114 rather than installing media monitoring functionality as a program separate from the instrumented application 114.

As further described in connection with FIGS. 2 and/or 3, the media monitoring functionality of the instrumented application 114 includes instructions (e.g., Java, java script, or any other computer language or script) that, when executed by the media device 106, cause the media device 106 to collect and/or otherwise identify the media ID 122 of the media 118 presented by the instrumented application 114 and/or the media device 106, and to collect one or more user and/or device identifier(s) 124 stored in the data store 119 of the media device 106. The user and/or device identifier(s) 124 of the illustrated example include identifiers that can be used by corresponding ones of the partner database proprietors 104a-b to identify the user or users of the media device 106, and to locate user information 102a-b corresponding to the user(s). For example, the device/user identifier(s) 124 may include hardware identifiers (e.g., an international mobile equipment identity (IMEI), a mobile equipment identifier (MEID), a media access control (MAC) address, etc.), an app store identifier (e.g., a Google Android ID, an Apple ID, an Amazon ID, etc.), an open source unique device identifier (OpenUDID), an open device identification number (ODIN), a login identifier (e.g., a username), an email address, user agent data (e.g., application type, operating system, software vendor, software revision, etc.), third-party service identifiers (e.g., advertising service identifiers, device usage analytics service identifiers, demographics collection service identifiers), cookies, etc. In some examples, fewer or more device/user identifier(s) 124 may be used. In addition, although only two partner database proprietors 104a-b are shown in FIG. 1, the AME 108 may partner with any number (e.g., 1, 2, 3, 4, etc.) of partner database proprietors to collect distributed user information (e.g., the user information 102a-b). In examples disclosed herein, the database proprietors 104 collect and/or establish the device and/or user identifier 124 via, for example, an application associated with the database proprietor 104, a user registration process where a user of the media device 106 provides the device and/or user identifier 124, etc.

In the illustrated example, the device/user identifier 124 is set by a manufacturer and/or operating system provider of the media device 106. For example, the device/user identifier 124 for an iOS device (e.g., an Apple iPad®, an Apple iPhone®, etc.) may be an Apple ID, set by Apple, Inc. for use with the Apple iTunes app store (e.g., the app source 112). That is, in some examples, the device/user identifier is not set by the database proprietor 104, and is not set by the audience measurement entity 108.

In some examples, the types of device/user identifiers 124 are different from device to device depending on the type of device, the manufacturer of the device, the software installed on the device, etc. For example, a media device having cellular 2G, 3G, and/or 4G capabilities will have an assigned IMEI number. However, a media device capable of Wi-Fi, but not having cellular communication capabilities, will not have an IMEI number. As such, one or more other parameter(s) of the Wi-Fi media device may be used as the device/user identifiers 124. Such other parameters may include, for example, a MAC address, a login ID, or any other identifier or information available to the Wi-Fi capable device and that is not specific to cellular communications.

By being able to select or access multiple different types of device/user identifiers 124, the AME 108 increases the opportunities for collecting corresponding user information. For example, the AME 108 is not tied to requesting user information from a single source (e.g., only one of the partner database proprietors 104a-b). Instead, the AME 108 can leverage relationships with multiple partner database proprietors (e.g., the partner database proprietors 104a-b). If one or some partner database proprietors are unable or become unwilling to share user data, the AME 108 can request the user data from one or more other partner database proprietor(s).

In some examples, the media device 106 may not allow access to identification information stored in the media device 106. For such instances, the disclosed examples enable the AME 108 to store an AME-provided identifier (e.g., an identifier managed and tracked by the AME 108 such as a panelist identifier) in the media device 106 to track media impressions on the media device 106. For example, the AME 108 may provide instructions in the instrumented application 114 to set an AME-provided identifier (e.g., a cookie, a register, etc.) in memory space (e.g., the memory 119) accessible by and/or allocated to the instrumented application 114. In such examples, the AME-provided identifier set by the instrumented application 114 persists in the data store 119 (e.g., a memory) even when the instrumented application 114 is not running. In this manner, the same AME-provided identifier can remain associated with the media device 106 for extended durations. In some examples in which the instrumented application 114 sets an identifier in the media device 106, the AME 108 may recruit a user of the media device 106 as a panelist, and may store user information collected from the user during a panelist registration process and/or may collect such information by monitoring user activities/behavior via the media device 106 and/or any other device used by the user and monitored by the AME 108. In this manner, the AME 108 can associate user information of the user (from panelist data stored by the AME 108) with media exposures attributed to the user on the media device 106.

In the illustrated example, the instrumented application 114 sends (block 116) the media ID 122 and the one or more device/user identifier(s) 124 as collected data 126 to the AME 108. Alternatively, the instrumented application 114 may be configured to send the collected data 126 to another collection entity (other than the AME 108) that has been contracted by the AME 108 or is partnered with the AME 108 to collect media ID's (e.g., the media ID 122) and device/user identifiers (e.g., the device/user identifier(s) 124) from media devices (e.g., the media device 106). For example, the collected data 126 may be transmitted to a collection facility and then forwarded (e.g., proxied) to the AME 108. After receiving the collected data 126, the AME 108 sends (block 117) the received device/user identifier(s) 124 to corresponding partner database proprietors (e.g., the partner database proprietors 104a-b) as part of a request for user information (e.g., the user information 102a-b) corresponding to the device/user identifier(s) 124 so that the AME 108 can associate the user information with corresponding media impressions of media (e.g., the media 118) presented at media devices (e.g., the media device 106).

While in examples disclosed herein the instrumented application 114 transmits the collected information directly to the AME 108, the collected information may be transmitted to the AME 108 in any other fashion. For example, collected information may be transmitted to the database proprietor 104 from the mobile device 106, and then periodically transmitted to the AME 108 by the database proprietor 104. Further, any other third party (e.g., the app publisher 110, the media publisher 120, etc.) may be involved in the transmission of the collected data 126 to the AME 108.

Figure 2:
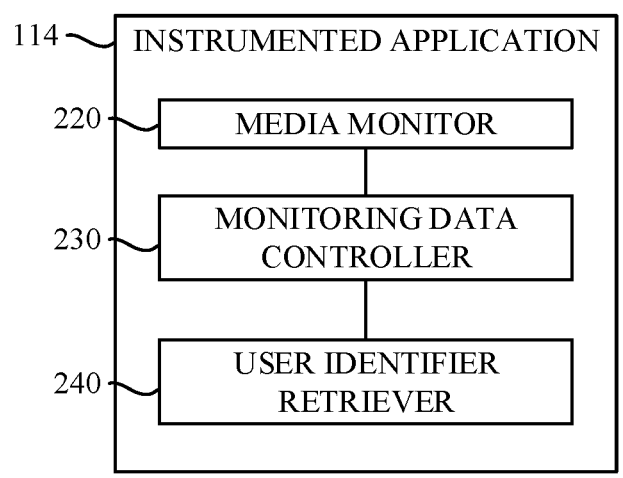
FIG. 2 is a block diagram of an example implementation of the example instrumented application of FIG. 1.
Figure 3:
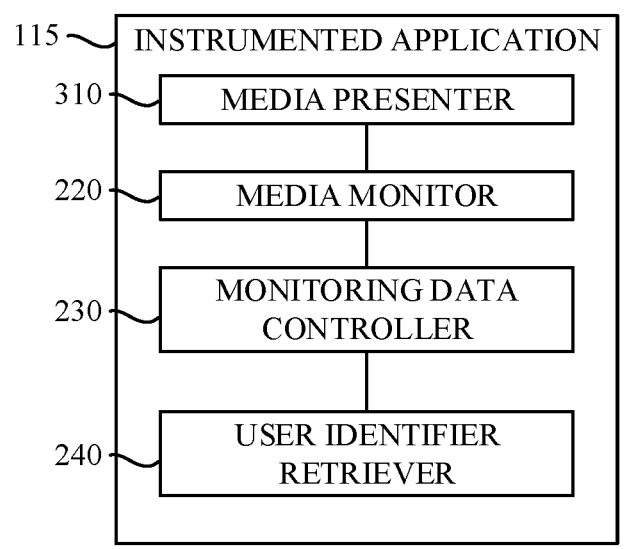
FIG. 3 is a block diagram of an alternate example implementation of the example instrumented application of FIG. 1.

FIG. 2 is a block diagram of an example implementation of the example instrumented application 114 of FIG. 1. FIG. 3 is a block diagram of an alternate example implementation 115 of the example instrumented application 114 of FIG. 1. The instrumented applications 114, 115 of the illustrated examples of FIGS. 1, 2, and/or 3 are implemented as software downloadable via the Internet. As such, it is implemented as computer-readable instructions which may be executed on a logic circuit such as a hardware processor of the media device 106. In the illustrated example, the instrumented application 114, 115 is provided by the app source 112. However, the instrumented application 114, 115 may be provided by any other entity. In some examples, the instrumented application is installed on the media device 106 by the user by downloading the instrumented application 114, 115 from the app source 112 (e.g. Apple iTunes, Google play, etc.).

The instrumented application 114 of the illustrated example of FIG. 2 does not present media itself, but rather, interfaces with another application of the media device 106 to present media. In contrast, the instrumented application 115 of the illustrated example of FIG. 3 presents media retrieved from the media provider 110 via a media presenter 310.

In examples disclosed herein, the instrumented application 114, 115 is implemented to include monitoring functionality provided by the monitoring entity via, for example, a software development kit (SDK). In such examples, the monitoring functionality transmits monitoring information to the AME 108. In the illustrated examples of FIGS. 2 and/or 3, the example instrumented application 114, 115 includes a media monitor 220, a monitoring data controller 230, and a user identifier retriever 240. In addition, the example instrumented application 115 of the illustrated example of FIG. 3 includes a media presenter 310.

The example media monitor 220 of the illustrated example of FIGS. 2 and/or 3 is implemented by computer executable instructions. The media monitor 220 of FIGS. 2 and/or 3 is downloaded with the instrumented app 114 and is initiated when the instrumented application 114 is launched on the media device 106. The media monitor 220 of the illustrated example extracts metering data (e.g., metadata, signatures, watermarks, etc.) from the media presented by the media device (e.g., via the media presenter 310 of FIG. 3 or a separate application). For example, the media monitor 220 can implement functionality provided by a software development kit (SDK) to extract one or more audio watermarks, one or more video (e.g., image) watermarks, etc., embedded in the audio and/or video of the presented media. For example, the media may include pulse code modulation (PCM) audio data or other types of audio data, uncompressed video/image data, etc. In the illustrated example, the media monitor 220 identifies metadata contained in an ID3 tag transmitted as part of and/or in association with the presented media. In the illustrated example, the ID3 tag includes media-identifying metadata and/or source-identifying metadata. Example methods and apparatus to transcode watermarks into ID3 tags identifiable by the media monitor 220 are disclosed in U.S. patent application Ser. No. 13/341,646, U.S. patent application Ser. No. 13/341,661, which are incorporated in their entireties.

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio and/or video component is selected to have a signal characteristic sufficient to hide the watermark from human detection (e.g., masked from hearing). This is sometimes referred to as stenographic encoding. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). Good signatures are repeatable when processing the same media presentation, but are unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

In some examples, the code/watermark itself and/or data representing the code/watermark is transmitted with and/or in association with the media as media-identifying metadata. The media-identifying metadata may be formatted in a text or binary format such as, for example, an ID3 tag. In some examples, the media-identifying metadata includes the code/watermark. However, in some other examples, the media-identifying metadata is derived from and/or representative of the code/watermark, and/or a signature, etc. Example methods and apparatus to transcode watermarks into ID3 tags are disclosed in U.S. patent application Ser. No. 13/341,646, U.S. patent application Ser. No. 13/341,661, U.S. patent application Ser. No. 13/443,596, U.S. patent application Ser. No. 13/793,991, U.S. patent application Ser. No. 13/455,961, U.S. patent application Ser. No. 13/793,974, U.S. patent application Ser. No. 13/472,170, U.S. patent application Ser. No. 13/793,983, U.S. patent application Ser. No. 13/767,548, U.S. patent application Ser. No. 13/793,959, and U.S. patent application Ser. No. 13/778,108 which are hereby incorporated by reference in their entireties.

In the illustrated example of FIGS. 2 and/or 3, the example media monitor 220 determines (e.g., extracts, transforms, derives, decodes, converts, etc.) the media-identifying metadata (e.g., such as media identifying information, source identifying information, watermarks, codes, etc.) associated with, and/or transmitted with the media (e.g., in an ID3 tag, in a Hypertext Transfer Protocol (HTTP) Live Streaming (HLS) manifest, in an Moving Pictures Experts Group version 2 (MPEG2) transport stream, in a timed text track, in an encryption key associated with the media, etc.). The media-identifying metadata may be a code in, for example, a text or binary format located in an ID3 tag associated with the media. In some examples, the media monitor 220 converts the metering data into a text and/or binary format for transmission to the AME 108.

The example monitoring data controller 230 of the illustrated example of FIGS. 2 and/or 3 is implemented by computer executable instructions. In the illustrated example, the monitoring data controller 230 manages records stored in the data store 119. For example, the data controller 230 controls transmission of stored records (e.g., the collected data 126), deletion of aged records, determining if a storage threshold of the data store 119 is exceeded, etc.

The example user identifier retriever 240 illustrated in FIGS. 2 and/or 3 is implemented by computer executable instructions. The example user identifier retriever 240 of the illustrated example retrieves the user and/or device identifier 124 from the data store 119. In some examples, the user identifier retriever 240 interacts with an operating system (e.g., Apple iOS, Google Android, etc.) to retrieve the user and/or device identifier 124.

The example media presenter 310 of the illustrated example of FIG. 3 is implemented by computer executable instructions. In the illustrated example, the media presenter 310 interacts with a QuickTime® application programming interface (API) to display media via the media device 106. While in the illustrated example, the QuickTime® API is used, any other media presenting framework may additionally or alternatively be employed. For example, the media presenter 310 of the illustrated example may interact with an Adobe® Flash® media presentation framework.

Figure 4:
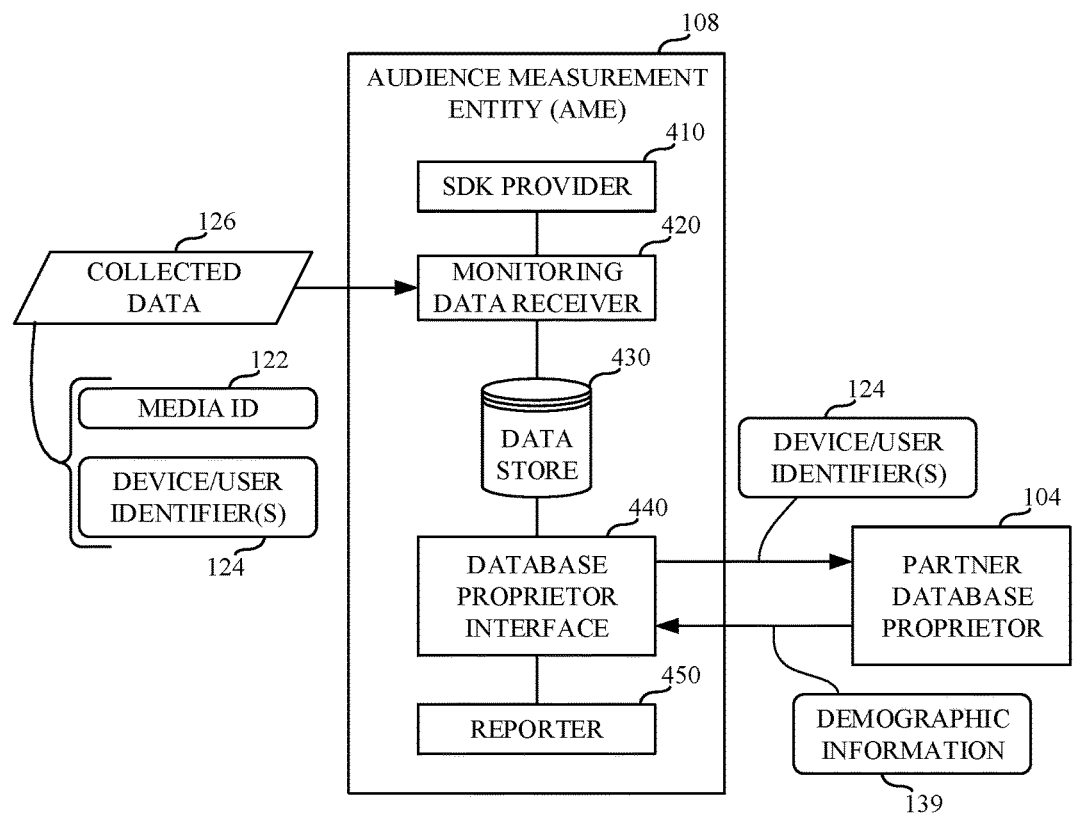
FIG. 4 is a block diagram of an example implementation of the example audience measurement entity of FIG. 1.

FIG. 4 is a block diagram of an example implementation of the example audience measurement entity 108 of FIG. 1. The audience measurement entity 108 of the illustrated example is a facility of an audience measurement entity (e.g., the Nielsen Company (US) LLC) and includes an interface to receive reported metering information (e.g., metadata) from the media device 106 via a network such as, for example, the Internet. The example audience measurement entity 108 of the illustrated example of FIG. 1 includes a software development kit (SDK) provider 410, a monitoring data receiver 420, a data store 430, a database proprietor interface 440, and a reporter 450.

The example SDK provider 410 of the illustrated example of FIG. 1 is implemented by a logic circuit such as a semiconductor (e.g., silicon) based processor executing instructions, but it could additionally or alternatively be implemented by an application specific integrated circuit (ASIC), a programmable logic device (PLD), a field programmable logic device (FPLD), an analog circuit, and/or other digital circuitry. The example SDK provider 410 of FIG. 4 provides instructions to application developers (e.g., the app publisher 110) to facilitate creation of the instrumented application 114. In some examples, the SDK is provided such that the application developer(s) can integrate the SDK, libraries (e.g., DLLs), and/or application programming interfaces (APIs) of the SDK into existing applications. While in the illustrated example the monitoring components are provided as an SDK, the monitoring components instrumented by the SDK and/or monitoring instructions provided via the SDK may be provided in any other fashion. For example, the monitoring components may be provided as an application programming interface (API), a plugin, an add-on, libraries, etc.

The example monitoring data receiver 420 of the illustrated example of FIG. 4 is implemented by a logic circuit such as a silicon based processor executing instructions, but it could additionally or alternatively be implemented by an ASIC, a PLD, an FPLD, an analog circuit, and/or other digital circuitry. The example monitoring data receiver 420 of FIG. 4 receives media monitoring information such as the collected data 126 (e.g., media identifiers 122 and/or device/user identifiers 124) from the instrumented application 114. As disclosed herein, media monitoring information may include media-identifying information (e.g., media-identifying metadata, codes, signatures, watermarks, and/or other information that may be used to identify presented media), application usage information (e.g., an identifier of an application, a time and/or duration of use of the application, a rating of the application, etc.), user-identifying information (e.g., demographic information, a panelist identifier, a username, etc.), device identifying information (e.g., a MAC address, an IP address, a device serial number, etc.) etc. The monitoring data receiver 420 stores the received monitoring information in the data store 430.

In the illustrated example, the monitoring data receiver 420 implements an HTTP interface. HTTP requests are sent with the media monitoring information in their payload by the instrumented application 114 to the monitoring data receiver 420. The requests may not be intended to actually retrieve media, but are instead used as a vehicle to convey the metering information. Thus, the HTTP requests may be referred to as "dummy requests." The AME 108 is provided with software (e.g., a daemon) to extract the metering information from the payload of the dummy request(s). Additionally or alternatively, any other method(s) to transfer the metering information may be used such as, for example, an HTTP Secure protocol (HTTPS), a file transfer protocol (FTP), a secure file transfer protocol (SFTP), an HTTP and/or HTTPS GET request, an HTTP and/or HTTPS POST request, etc.

In the illustrated example, the example monitoring data receiver 420 stores and analyzes the monitoring information received from the instrumented application(s) 114 from different media devices. For example, the example monitoring data receiver 420 may sort and/or group metering information by media publisher 120 (e.g., by grouping all metering data associated with a particular media publisher 120, and/or associated with a particular instrumented application 114). Any other processing of media monitoring information may additionally or alternatively be performed. In some examples, the monitoring data receiver 420 adds a timestamp to the media monitoring information upon receipt. Timestamping (e.g., recording a time that an event occurred) enables accurate identification and/or correlation of media that was presented with the demographics of the user(s) of the media device(s).

The example data store 430 of the illustrated example of FIG. 4 may be any device for storing data such as, for example, flash memory, magnetic media, optical media, etc. The data store 430 of the illustrated example of FIG. 4 stores monitoring information received at the monitoring data receiver 420 (e.g., the collected data 126, etc.). However, the data store 430 may additionally or alternatively store any other information. Furthermore, the data stored in the data store 430 may be in any data format such as, for example, binary data, comma delimited data, tab delimited data, structured query language (SQL) structures, etc. While in the illustrated example the data store 430 is illustrated as a single database, the data store 430 may be implemented by multiple databases, and/or be stored in multiple memory locations of the media device.

The example database proprietor interface 440 of the illustrated example of FIG. 4 is implemented by a logic circuit such as a hardware processor executing instructions, but it could additionally or alternatively be implemented by an ASIC, a PLD, an FPLD, an analog circuit, and/or other digital circuitry. The example database proprietor interface 440 requests demographic information 139 (e.g., the user information 102 of FIG. 1) from the database proprietors 104. In the illustrated example, to request such information the database proprietor interface 440 transmits device/user identifiers 124 to the database proprietor 104. In the illustrated example, the example database proprietor interface 440 implements a database driver such as an Open Database Connectivity (ODBC) driver to communicate with the database proprietor. However, any other method of communicating with the database proprietor may additionally or alternatively be used such as, for example, HTTP communications, FTP communications, SQL queries, etc.

In some examples, the database proprietor interface 440 transmits a single device/user identifier 124 at a time. However, to protect privacy, the database proprietor 104 may respond to such requests for demographic information 139 in the aggregate and require a minimum threshold of device/user identifiers 124 to sufficiently mask the demographic information associated with any single particular device and/or user. In the illustrated example, the minimum threshold is one hundred device/user identifiers. However, any other minimum threshold may additionally or alternatively be used such as, for example, two hundred device/user identifiers, one thousand device/user identifiers, ten thousand device/user identifiers, etc.

The example reporter 450 of the illustrated example of FIG. 4 is implemented by a logic circuit such as a central processing unit (CPU) executing instructions, but it could additionally or alternatively be implemented by an ASIC, a PLD, an FPLD, an analog circuit, and/or other circuitry. The reporter 450 generates reports indicative of media exposure metrics and/or application usage metrics (e.g., ratings, impressions, etc.) based on one or more different types of client devices (e.g., personal computers, portable devices, mobile phones, tablets, etc.). For example, the reporter 450 compiles media exposure metrics based on the correlation of the media-identifying information, the application usage information, and the user-identifying information. A report is then generated to indicate media exposure and/or application usage statistics. In some examples, the exposure measurements provide ratings information for different media (e.g., a particular television show, a particular website, a particular movie, etc.) In some examples, the exposure measurements indicate ratings information and/or usage statistics for different instrumented applications.

Additionally or alternatively, popularities of different types of media across different device types may be reported. Such different types of media may be, for example, news, movies, television programming, on-demand media, Internet-based media, games, streaming games, advertisements, etc. Such comparisons may be made across any type(s) and/or numbers of devices including, for example, cell phones, smart phones, dedicated portable multimedia playback devices, iPod® devices, tablet computing devices (e.g., an iPad®), standard-definition (SD) televisions, high-definition (HD) televisions, three-dimensional (3D) televisions, stationary computers, portable computers, Internet radios, etc. Any other type(s) and/or number of media and/or devices may be analyzed. The report may also associate the media exposure metrics with demographic segments (e.g., age groups, genders, ethnicities, etc.) corresponding to the user(s) of the client device(s). Additionally or alternatively, the report may associate the media exposure metrics with metric indicators of the popularity of the artist, genre, song, title, etc., across one or more user characteristics selected from one or more demographic segment(s), one or more age group(s), one or more gender(s), and/or any other user characteristic(s).

In some examples, the media exposure metrics are used to determine demographic reach of streaming media, ratings for streaming media, engagement indices for streaming media, user affinities associated with streaming media, broadcast media, and/or any other audience measure metric associated with streaming media and/or locally stored media. While in the illustrated example, the media exposure metrics are used to provide information for streaming media, the media exposure metrics may be used to provide information for any other type of media such as, for example, websites, non-streaming media, etc. In some examples, the media exposure metrics are audience share metrics indicative of percentages of audiences for different applications and/or types of applications that accessed the same media. For example, a first percentage of an audience may be exposed to news media via a browser application, while a second percentage of the audience may be exposed to the same news media via a news reader application.

Although for simplicity, the above discussion focuses on a single media device 106, a single instrumented app 114, a single media publisher 120, a single app source 112, and a single AME 108, any number of any of these elements may be present. For example, in a typical implementation, it is expected that multiple app sources will offer multiple different instrumented apps to the public at large. Thus, it is expected that there will be many media devices accessing such apps, and that a significant portion of the users will use such instrumented applications. Thus, it is expected that there will be many instances of the above processes conducted across many devices at the overlapping and/or distinct times. Thus, for example, there may be many instantiations of the machine-readable instructions disclosed in the above flowcharts operating at the same or different time.

Some of these instances may be implemented as parallel threads operating on a same device.

While an example manner of implementing the audience measurement entity (AME) 108 of FIG. 1 and/or the instrumented application 114 of FIG. 1 is illustrated in FIGS. 2, 3, and/or 4, one or more of the elements, processes and/or devices illustrated in FIGS. 2, 3, and/or 4 may be combined, divided, re-arranged, omitted, eliminated and/or implemented in any other way. Further, the example media presenter 310, the example media monitor 220, the example monitoring data controller 230, the example user identifier retriever 240, and/or, more generally, the example instrumented application 114, 115 of FIGS. 2 and/or 3, and/or the example SDK provider 410, the example monitoring data receiver 420, the example data store 430, the example database proprietor 440, the example reporter 450, and/or, more generally, the example AME 108 of FIG. 4 may be implemented by hardware, software, firmware and/or any combination of hardware, software and/or firmware. Thus, for example, any of the example media presenter 310, the example media monitor 220, the example monitoring data controller 230, the example user identifier retriever 240, and/or, more generally, the example instrumented application 114, 115 of FIGS. 2 and/or 3, and/or the example SDK provider 410, the example monitoring data receiver 420, the example data store 430, the example database proprietor 440, the example reporter 450, and/or, more generally, the example AME 108 of FIG. 4 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example media presenter 310, the example media monitor 220, the example monitoring data controller 230, the example user identifier retriever 240, and/or, more generally, the example instrumented application 114, 115 of FIGS. 2 and/or 3, and/or the example SDK provider 410, the example monitoring data receiver 420, the example data store 430, the example database proprietor 440, the example reporter 450, and/or, more generally, the example AME 108 of FIG. 4 is/are hereby expressly defined to include a tangible computer readable storage device or storage disk such as a memory, a digital versatile disk (DVD), a compact disk (CD), a Blu-ray disk, etc. storing the software and/or firmware. Further still, the example instrumented application 114 of FIGS. 2 and/or 3, and/or the audience measurement entity 108 of FIG. 4 may include one or more elements, processes and/or devices in addition to, or instead of, those illustrated in FIG. 4, and/or may include more than one of any or all of the illustrated elements, processes and devices.

Figure 5:
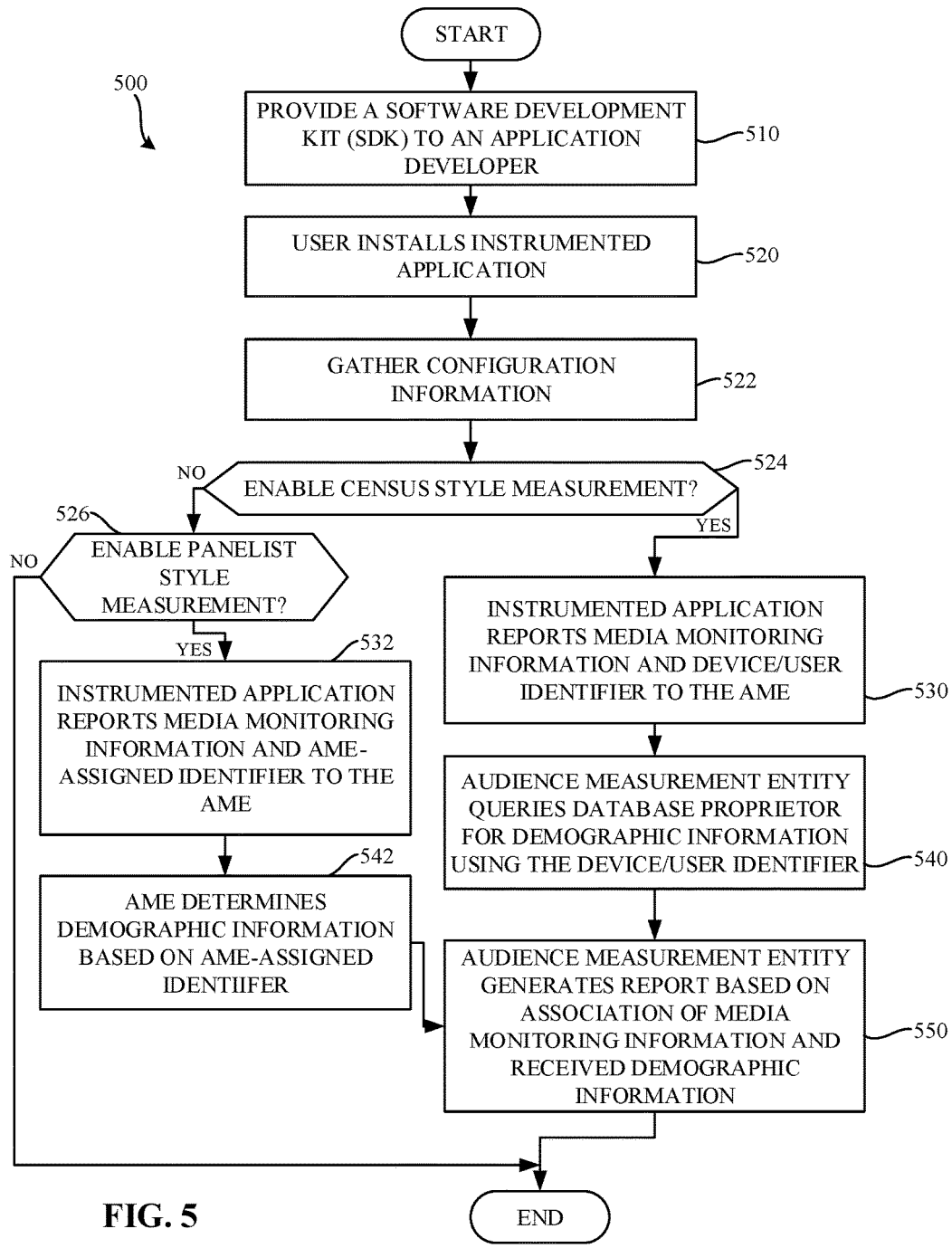
FIG. 5 is a flowchart representative of example machine-readable instructions that may be executed to implement the system of FIG. 1.
Figure 6:
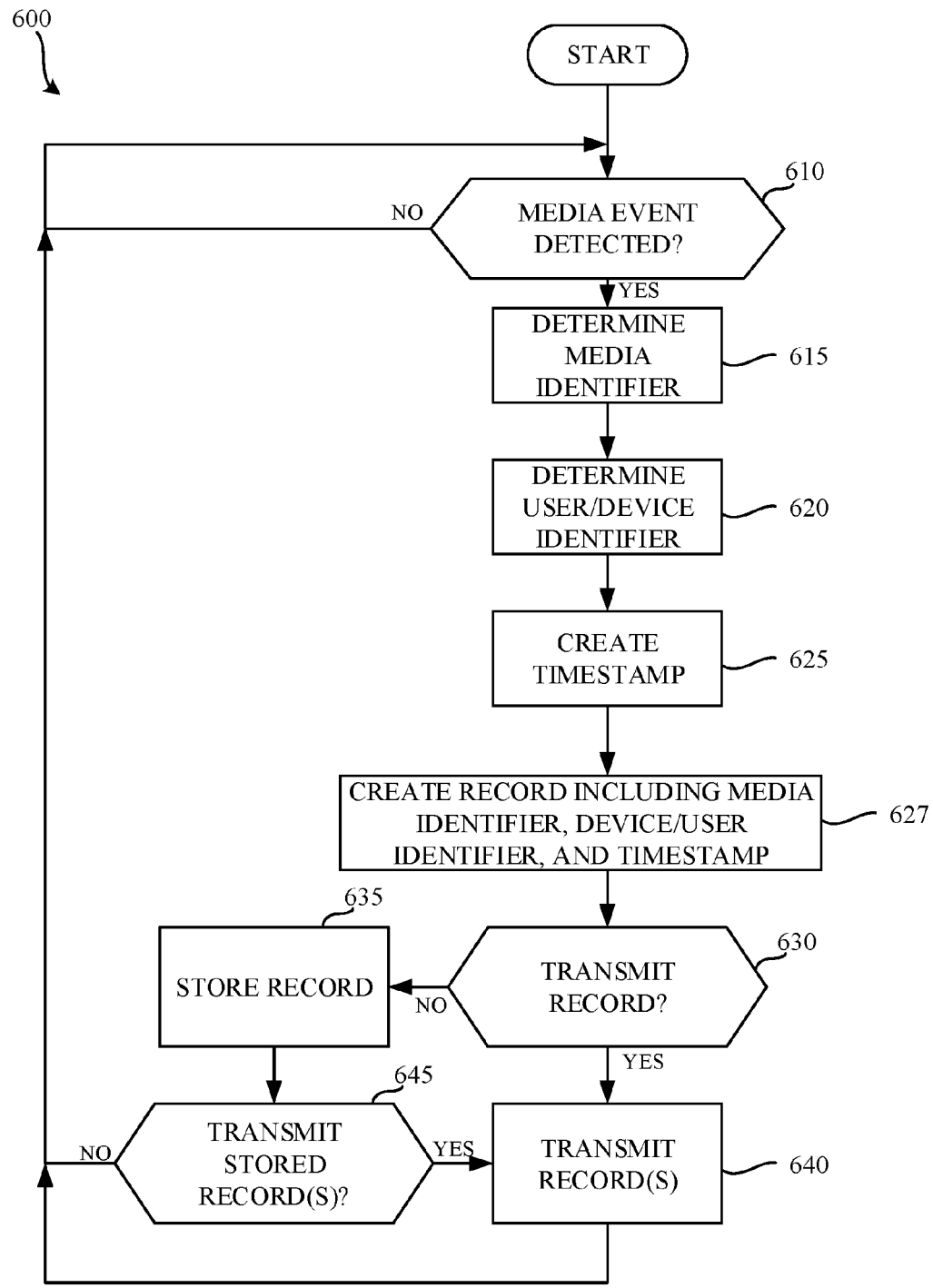
FIG. 6 is a flowchart representative of example machine-readable instructions that may be executed to implement the example instrumented application of FIGS. 1, 2, and/or 3.

Flowcharts representative of example machine readable instructions for implementing the example instrumented application 114, 115 of FIGS. 2 and/or 3, and/or the example audience measurement entity 108 of FIG. 4 are shown in FIGS. 5, 6, and/or 7. In these examples, the machine readable instructions comprise a program(s) for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIGS. 5, 6, and/or 7, many other methods of implementing the example instrumented application 114, 115 of FIGS. 2 and/or 3, and/or the example audience measurement entity 108 of FIG. 4 may alternatively be used. For example, the order of execution of the blocks may be changed, and/or some of the blocks described may be changed, eliminated, or combined.

As mentioned above, the example processes of FIGS. 5, 6, and/or 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 5, 6, and/or 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

FIG. 5 is a flowchart representative of example audience measurement entity 108 and/or the example instrumented application 114, 115 of FIGS. 1, 2, 3, and/or 4. The example program 500 of FIG. 5 begins when the SDK provider 410 provides a software development kit (SDK) to the app publisher 110 (block 510). The SDK enables the application publisher 110 to create the instrumented application 114. In the illustrated example, monitoring functionality is provided via an SDK. However, monitoring functionality may be provided via, for example, an API, a programming library, a dynamically linked library (DLL), a plug-in, an add-on, etc.

In the illustrated example, a user of the media device 106 instructs the media device 106 to install the instrumented application (block 520). In the illustrated example, the media device 106 installs the instrumented application 114 from an app source 112 such as, for example, Apple iTunes, Google Play, etc. In some examples, the instrumented application 114 is provided directly to the media device 106 via, for example, a website, a mailed compact disc, etc. In some examples, the instrumented application 114 is provided to a media device manufacturer and/or reseller. In examples where the instrumented application 114 is provided to the media device manufacturer, the media device manufacturer may design (e.g., develop, produce, manufacture, etc.) the media device with the instrumented application 114 as an integrated component. In examples where the instrumented application 114 is provided to the reseller, the reseller may install (e.g., modify, alter, adapt, etc.) the instrumented application 114 on the media device 106 at or prior to the time of sale of the media device to the retailer and/or to the end user (e.g., the consumer).

When executed by the media device 106, the instrumented application 114 gathers configuration information (block 522). In the illustrated example of FIG. 5, configuration information instructs the instrumented application 114 as to how the instrumented application 114 should operate. For example, application publisher(s) may wish to enable/disable the use of census style measurement, enable/disable the use of panelist style measurement, and/or enable/disable the collection of demographic information from the database proprietors in the aggregate and/or individually. In some examples, application publisher(s) may wish to disable media monitoring functionality of the instrumented application 114 entirely. Furthermore, in some examples the application publisher(s) may wish to allow the user to select how the instrumented application operates 114 via, for example, an opt-in and/or an opt-out. That is, users may be able to override the configuration information and, instead, instruct the instrumented application 114 as to how the instrumented application 114 should operate with respect to enabling/disabling census style measurement, enabling/disabling panelist style measurement, and/or enabling/disabling collection of demographic information from the database proprietors in the aggregate and/or individually. Users may override the configuration information because, for example, local privacy laws may restrict the collection of monitoring information, the user may object to being monitored, etc.

In the illustrated example, the instrumented application 114 gathers the configuration information via the Internet. In the illustrated example, the configuration information is provided as an electronically readable file (e.g., an extensible markup language (XML) document, a text file, etc.). In some examples, the instrumented application 114 retrieves the configuration information from the application publisher 110. However, in some other examples the instrumented application 114 retrieves the configuration information from another location such as, for example, the app source 112, the audience measurement entity 108, etc. However, in some examples, the configuration information is stored locally on the media device 106. In some examples, the locally stored configuration information is editable and/or modifiable by a user and/or an application operated by a user. In some examples, the locally stored configuration information is included as part of the instrumented application 114. That is, the configuration information is included as part of the instrumented application provided by the app source 112. The application publisher 110 may then modify the configuration information via, for example, an application update.

In the illustrated example, the configuration information is gathered each time the instrumented application 114 is started. However, in some examples, the configuration information is gathered at another time such as, for example, when the instrumented application 114 is installed, when the instrumented application 114 is updated, at the request of a user, periodically (e.g., every hour, once a week, monthly, etc.), etc.

The instrumented application 114 then inspects the configuration information to determine whether census style measurement is enabled (e.g., a flag associated with census style measurement is set) (block 524). As described above, when census style measurement is used, the user is identified using the device and/or user identifier. When census style measurement is enabled, control proceeds to block 530. In some examples, the configuration information may indicate that census style measurement is disabled (block 524). If census style measurement is disabled, the instrumented application 114 inspects the configuration information to determine whether panelist style measurement is enabled (e.g., a flag associated with panelist style measurement is set) (block 526). As disclosed above, when panelist style measurement is enabled, the user is identified using an AME-provided panelist identifier. If panelist style measurement is enabled, (block 526), control proceeds to block 532. In some examples, the configuration information indicates that neither census style measurement nor panelist style measurement should be enabled. In such an example, the instrumented application 114 takes no further monitoring action(s) as the configuration information indicates that monitoring should not be enabled. Any manner of enabling and/or disabling the various modes may be used. For example, a first flag may be used to indicate whether any form of monitoring is used and a second flag may be set to a first state to indicate panelist style monitoring, and to a second state to indicate census style monitoring.

If census style measurement is enabled (block 524), the instrumented application 114, when executed by the media device 106, collects and/or reports media monitoring information (e.g., the collected data 126) to the monitoring data receiver 420 of the AME 108 (block 530). In examples disclosed herein, media monitoring information includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or the device and/or user identifier (e.g., an Apple ID, demographic information, a username, a device serial number, a MAC address, an IP address, etc.). Further, the media monitoring information may include an indication of the permission given by the user and/or the application publisher 110. For example, the configuration information may indicate that census style measurement is used. Furthermore, the configuration information may indicate whether the demographic information of the user may be retrieved from the database proprietor on an individual and/or aggregate basis. That is, different application publishers 110 and/or different users may select different permissions. For example, a first user and/or application publisher 110 may enable census monitoring with demographic information being collected from the database proprietor(s) on an individual basis, while a second user and/or application publisher 110 may enable census monitoring with demographic information being collected from the database proprietor(s) in the aggregate. To enable the example ratings entity to carry out the wishes of the user and/or application publisher, the example media monitoring information includes one or more indicators (e.g., flags) indicating whether demographic information may be collected from the database proprietor(s) individually and/or in the aggregate.

If panelist style measurement is enabled (block 526), the instrumented application 114, when executed by the media device 106, collects and/or reports media monitoring information (e.g., the collected data 126) to the monitoring data receiver 420 of the AME 108 (block 530). In examples disclosed herein, media monitoring information includes, but is not limited to, media identifying information (e.g., media-identifying metadata, codes, signatures, watermarks, and/or other information that may be used to identify presented media, an ID3 tag), application usage information (e.g., an identifier of an application, a time and/or duration of use of the application, a rating of the application, etc.), and/or an AME-provided identifier (e.g., a panelist identifier, demographic information, a biometric identifier, personally identifiable information, etc.) Further, the media monitoring information may include an indication of the permission given by the user and/or the application publisher 110.

In the illustrated example, after the AME 108 receives the media monitoring information from the media device 106 implementing census style measurement, the database proprietor interface 440 sends the device/user identifier(s) to the database proprietor 104 as a request for demographic information (block 540). In some examples, the database proprietor interface 440 sends multiple received device/user identifiers associated with an impression for the same media ID. By requesting demographic information from the database proprietor 104 in the aggregate, demographic information for any single user is made anonymous. Additionally or alternatively, the database proprietor interface 440 may send a single device/user identifier associated with an impression for the media ID, to receive demographic information on an individual basis.

In the illustrated example, after the AME 108 receives the media monitoring information from the media device 106 implementing panelist style measurement, the AME 108 determines demographic information associated with the device and/or user identifier 124 (block 542). In the illustrated example, the demographic information is stored in, for example, the data store 430.

Based on the returned demographic information and/or the locally determined demographic information, the reporter 450 of the AME 108 generates a report based on the association of the media monitoring information (e.g., impressions for a particular media) and the received and/or determined demographic information (block 550). The report may, for example, indicate a demographic breakdown of the types of users to which different media presented.

FIG. 6 is a flowchart representative of example machine-readable instructions that may be executed to implement the example instrumented application of FIGS. 1, 2, and/or 3. The example program 600 of FIG. 6 begins when the example instrumented application 114 is installed. In the illustrated example, the application 114 is installed via an "app store" (e.g., Apple iTunes, Google Play, etc.). However, the application 114 may be installed in any other fashion. For example, the application 114 may be preinstalled on the media device (e.g., present at the time the media device was purchased). In some examples, the example program 600 of FIG. 6 begins when the example instrumented application 114 is executed. The example instrumented application 114 may be executed when, for example, a user clicks on an icon associated with the instrumented application 114. In examples disclosed herein, the instrumented application 114 is to perform a function unrelated to audience measurement (e.g., a game function, a media presentation function, a news presentation function, etc.) The instrumented application 114 may be any type of app including, for example, a game, a widget, a news reader, a browser, etc.

The media monitor 220 waits until a media event is detected (block 610). Media events may be triggered when, for example, the media presenter 310 begins playing a video, the media presenter 310 displays an image (e.g., an advertisement), the instrumented application 114 is restarted, etc. If a media event is not detected (block 610), the media monitor 220 continues to wait for a media event.

While in the illustrated example monitoring does occurs regardless of whether the user has given explicit permission to be monitored, in some examples, monitoring may occur only when the user has given permission to be monitored. A consent indicator may be stored in a memory of the media device 106 to indicate whether the media monitor 220 has the users consent to be monitored. When permission has not been granted, the monitoring functionality (e.g., the media monitor 220) may still operate. However, the collected monitoring information is not transmitted to the AME 108. That is, the monitoring functionality of the instrumented application 114 may operate, but not transmit collected monitoring data unless consent is received. Once consent is received, the monitoring data controller 230 may transmit the previously collected monitoring information to the AME 108 (as well as future monitoring information). In other words, the user's consent may be retroactive in that it authorizes previous monitoring activity.

If a media event is detected (block 610), the media monitor 220 determines a media identifier associated with media presented by the instrumented application 114 (block 615). In the illustrated example, the media monitor 220 extracts media-identifying metadata from an ID3 tag transmitted in association with the presented media (see, for example, U.S. patent application Ser. No. 13/341,646, U.S. patent application Ser. No. 13/341,661, U.S. patent application Ser. No. 13/443,596, U.S. patent application Ser. No. 13/793,991, U.S. patent application Ser. No. 13/455,961, U.S. patent application Ser. No. 13/793,974, U.S. patent application Ser. No. 13/472,170, U.S. patent application Ser. No. 13/793,983, U.S. patent application Ser. No. 13/767,548, U.S. patent application Ser. No. 13/793,959, and U.S. patent application Ser. No. 13/778,108). In some examples, the media monitor 220 determines the media identifier by extracting, decoding, etc. a code, a signature, and/or a watermark embedded in the presented media.

The example user identifier retriever 240 retrieves the device/user identifier from the data store 119 (block 620). In the illustrated example, the device/user identifier is an Apple ID, however any other device/user identifier may additionally or alternatively be used. In examples disclosed herein, the device/user identifier persists across multiple applications. While in the examples disclosed herein, the device/user identifier is an Apple ID, any other identifier that is retrieved in any other fashion may additionally or alternatively be used. For example, an AME 108 provided identifier retrieved from a pasteboard and/or memory of the media device 106, a database proprietor provided identifier stored as a cookie on the media device 106, etc. may be used.

The monitoring data controller 230 then creates a timestamp (block 625). Timestamping (e.g., recording a time that an event occurred) enables accurate identification and/or correlation of media that was presented with the user(s) using the media device 106 at that time. Usage of the media device 106 may be identified in any desired manner.

The monitoring data controller 230 of the illustrated example then creates a record including the media identifier (e.g., the media identifier obtained at block 615), the device/user identifier (of block 620), and the timestamp (of block 625). In some examples, the record includes one or more indicators (e.g., flags) indicating, for example, whether census style measurement was enabled, whether panelist style measurement was enabled, whether demographic information may be collected from the database proprietor(s) individually and/or in the aggregate, etc. In the illustrated example, the record is formatted as a comma separated value (CSV) record. However, any other type(s) and/or format(s) of record may additionally or alternatively be used. For example, the record may be formatted as an extensible markup language (XML) record.

The example monitoring data controller 230 of the illustrated example determines whether the record should be transmitted to the audience measurement entity 108 (block 630). In some examples, records are streamed to the audience measurement entity 108 as they are identified and/or created. If the example monitoring data controller 230 is to transmit the record to the audience measurement entity 108 (block 630), the monitoring data controller 230 transmits the record to the audience measurement entity 108 (block 640). In some examples, records are stored in the data store 119 so that they may be transmitted in a single transmission (e.g., a single HTTP request, a single file transfer protocol (FTP) command, etc.). If the example monitoring data controller 230 is not to transmit the record to the audience measurement entity 108 (block 630), the record is stored in the data store 119 by the monitoring data controller 230 (block 635).

The monitoring data controller 230 of the illustrated example determines whether a storage threshold of the data store 119 has been met or exceeded (block 645). In the illustrated example, the threshold represents an amount of time that records may be stored in the data store 119 before being transmitted to the audience measurement entity 108. Records may be stored for, for example, one hour, one day, one week, one month, etc. However, any other type of threshold may additionally or alternatively be used such as, for example, a storage limit (e.g., 1 kB, 64 kB, 1 MB, etc.). If the storage threshold is exceeded, the monitoring data controller 230 transmits the stored records to the audience measurement entity 108 (block 640). The media monitor 220 then continues to wait for media events from the media presenter 310 (block 610). If the storage threshold is not exceeded, the media monitor 220 continues to wait for media events from the media presenter 310 (block 610).

While in the illustrated example, a storage threshold is used to determine when to transmit monitoring information, any other way of making such a determination may additionally or alternatively be used. For example, monitoring information may be transmitted to the audience measurement entity 108 at a fixed interval (e.g., 30 minutes, 3 hours, 1 day, 1 week, etc.), monitoring information may be transmitted in response to an external event (e.g., user pushes a synchronize button, the audience measurement entity 108 requests updated monitoring information, the instrumented application 114 is started, the instrumented application 114 is exited, etc.).

Figure 7:
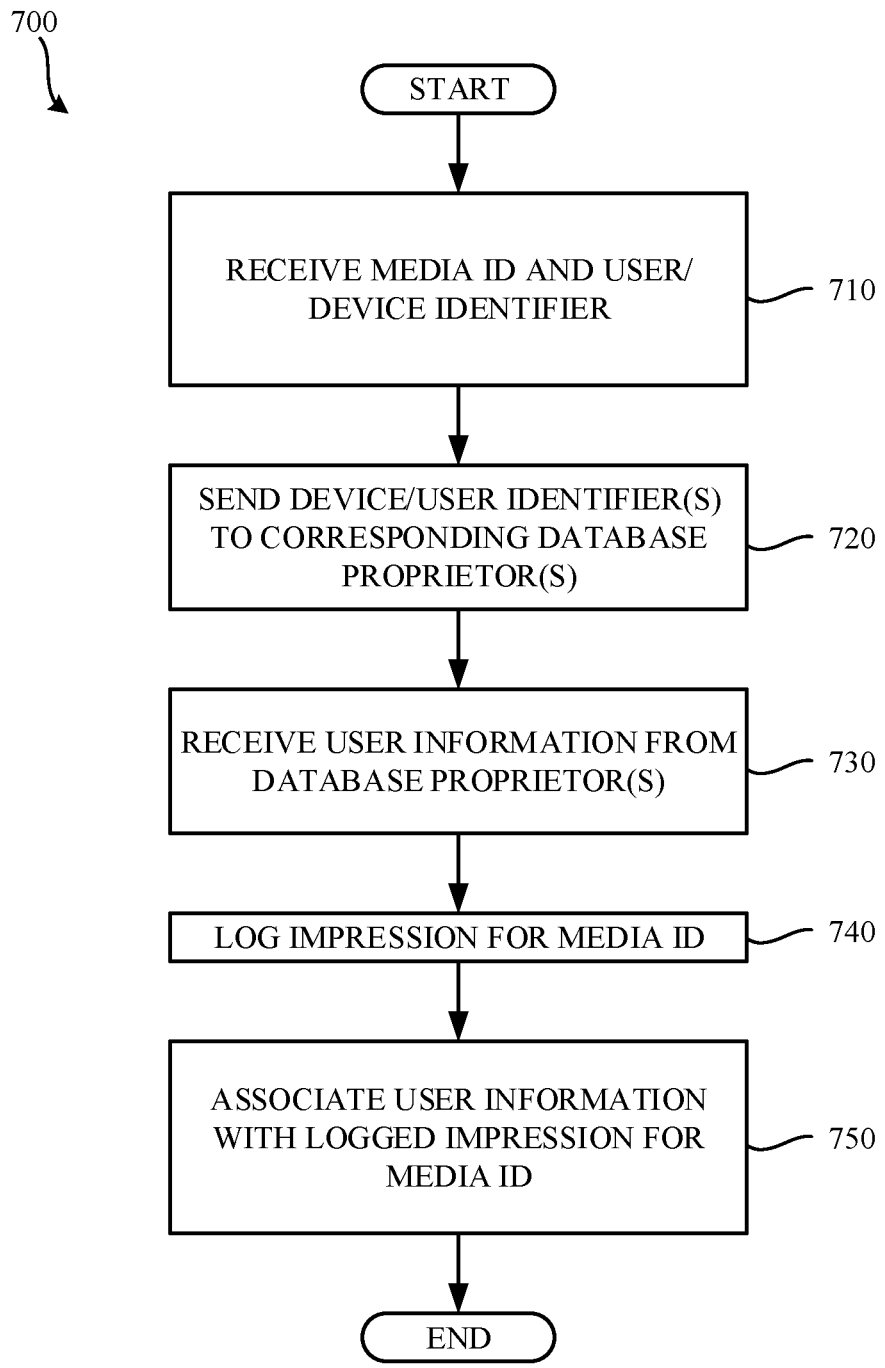
FIG. 7 is a flowchart representative of example machine-readable instructions that may be executed to implement the example audience measurement entity of FIGS. 1 and/or 4.

FIG. 7 is a flowchart representative of example machine-readable instructions that may be executed to implement the example audience measurement entity of FIGS. 1 and/or 4 to retrieve and/or credit media impressions with demographic information. Initially, the monitoring data receiver 420 receives the collected data 126 (e.g., the media ID and the user/device ID) (block 710). Demographic information requested from the database proprietors is requested in the aggregate and, accordingly, the database proprietor interface 440 aggregates user/device identifiers associated with a single media ID so that the demographic information can be requested.

The database proprietor interface 440 then transmits a request to the database proprietor 104 along with the device/user identifiers (block 720). In the illustrated example, the database proprietor interface 440 requests demographic information for a given set of device/user identifiers to a single database proprietor 104. However, the database proprietor interface 440 may request demographic information from multiple database proprietors in an effort to receive more complete demographic information. For example, different database proprietors using different user registration models may have different demographic information available. For example, a social media registration model may have demographic information related to user's race, interests, location, etc. while a credit reporting registration model may have demographic information related to a user's financial information (e.g., income, credit score, etc.). Such different database proprietors may be used in combination to generate more thorough demographic and/or exposure measures in association with the presented media.

The database proprietor interface 440 receives one or more of the user information 102*a-e* from one or more of the partner database proprietor(s) 104*a-e* (block 730). Based on the received media ID(s), the monitoring data receiver 420 logs a media impression for the media ID 122 (block 740). In addition, the monitoring data receiver 420 associates the user information from at least one of the one or more user information 102*a-e* with the logged impression for the media ID 122 (block 750). The example process 700 of FIG. 7 then ends.

Figure 8:
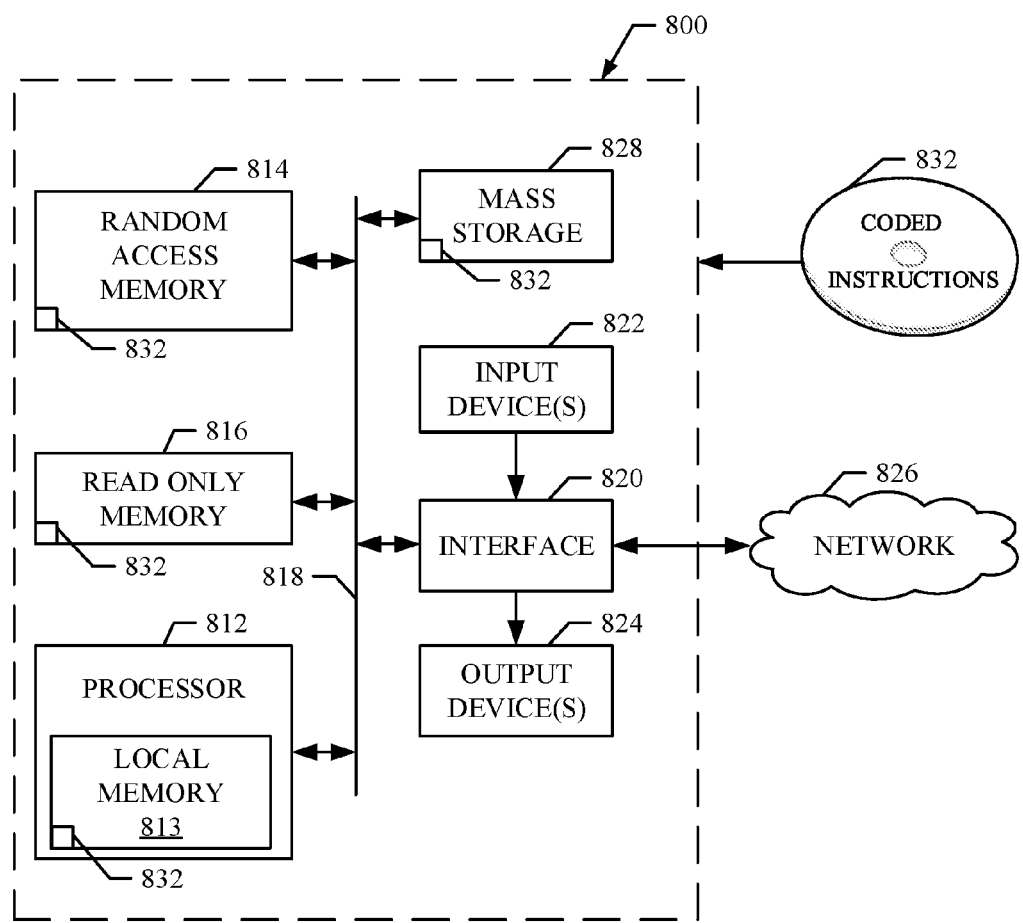
FIG. 8 is a block diagram of an example processor platform capable of executing the example machine-readable instructions of FIGS. 5, 6, and/or 7 to implement the example instrumented application of FIGS. 1, 2, and/or 3, and/or the example audience measurement entity of FIGS. 1 and/or 4.

FIG. 8 is a block diagram of an example processor platform 800 capable of executing the instructions of FIGS. 5, 6, and/or 7 to implement the example instrumented application 114, 115 of FIGS. 2 and/or 3, and/or the example audience measurement entity 108 of FIG. 4 The processor platform 800 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. Thus, for example, the processor may be implemented by a silicon and/or other semiconductor based processor.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), an infrared remote, a keyboard, a button, a mouse, a touchscreen, a track-pad, a trackball, and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIGS. 5, 6, and/or 7 may be stored in the mass storage device 828, in the volatile memory 814, in the non-volatile memory 816, and/or on a removable tangible computer readable storage medium such as a CD or DVD.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. A method of monitoring a media presentation, the method comprising:

installing a monitoring enabled application on a media device;

accessing, by executing an instruction with a processor, configuration information to instruct the monitoring enabled application to enable monitoring functionality, the configuration information to instruct the monitoring enabled application to operate in at least one of a census-based mode or a panelist-based mode;

identifying a media presentation event within the monitoring enabled application;

determining, by executing an instruction with the processor, a media identifier corresponding to the media presentation event when the monitoring functionality is enabled;

determining at least one of a user identifier or a device identifier associated with the media device when the monitoring functionality is enabled, the at least one of the user identifier or the device identifier assigned by an entity other than an audience measurement entity when the monitoring enabled application is to operate in the census-based mode, the at least one of the user identifier or the device identifier assigned by the audience measurement entity when the monitoring enabled application is to operate in the panelist-based mode; and transmitting a record including the media identifier and the at least one of the user identifier or the device identifier to the audience measurement entity when the monitoring functionality is enabled.

2. The method of claim 1, wherein the media identifier is an ID3 tag.

3. The method of claim 1, wherein the at least one of the user identifier or the device identifier is an Apple ID.

4. The method of claim 1, further including storing the record in a memory of the media device.

5. The method of claim 4, further including storing a timestamp in association with the record in the memory of the media device.

6. The method of claim 1, wherein the configuration information is accessed when the monitoring enabled application is executed.

7. The method of claim 1, wherein the configuration information includes an identifier indicating whether demographic information associated with the at least one of the user identifier or the device identifier may be collected on at least one of an aggregate basis or an individual basis.

8. The method of claim 7, wherein the record includes the identifier indicating whether the demographic information associated with the at least one of the user identifier or the device identifier may be collected on at least one of an aggregate basis or an individual basis.

9. The method of claim 8, wherein the audience measurement entity is to request the demographic information from a database proprietor using a plurality of at least one of user identifiers or device identifiers associated with the media identifier when the record indicates that the demographic information may be collected on the aggregate basis.

10. The method of claim 8, wherein the audience measurement entity is to request demographic information from a database proprietor using the at least one of the user identifier or device identifier associated with the media identifier when the record indicates that demographic information may be collected on the individual basis.

11. A tangible computer-readable storage medium comprising instructions which, when executed, cause a machine to at least:

install a monitoring enabled application on a media device;

access configuration information to instruct the monitoring enabled application to enable monitoring functionality, the configuration information to instruct the monitoring enabled application to operate in at least one of a census-based mode or a panelist-based mode;

identify a media presentation event within the monitoring enabled application;

determine a media identifier corresponding to the media of the media presentation event when the monitoring functionality is enabled;

determine at least one of a user identifier or a device identifier associated with the media device when the monitoring functionality is enabled, the at least one of the user identifier or the device identifier assigned by an entity other than an audience measurement entity when the monitoring enabled application is to operate in the census-based mode, the at least one of the user identifier or the device identifier assigned by the audience measurement entity when the monitoring enabled application is to operate in the panelist-based mode; and transmit a record including the media identifier and the at least one of the user identifier or the device identifier to an audience measurement entity when the monitoring functionality is enabled.

12. The computer-readable storage medium of claim 11, wherein the media identifier is an ID3 tag.

13. The computer-readable storage medium of claim 11, wherein the at least one of the user identifier or the device identifier is an Apple ID.

14. The computer-readable storage medium of claim 11, wherein the instructions, when executed, cause the machine to store the record in a memory of the media device.

15. The computer-readable storage medium of claim 14, wherein the instructions, when executed, cause the machine to at least store a timestamp in association with the record in the memory of the media device.

16. The computer-readable storage medium of claim 11, wherein the configuration information is accessed when the monitoring enabled application is executed.

17. The computer-readable storage medium of claim 11, wherein the configuration information includes an identifier indicating whether demographic information associated with the at least one of the user identifier or the device identifier may be collected on at least one of an aggregate basis or an individual basis.

18. The computer-readable storage medium of claim 17, wherein the record includes the identifier indicating whether the demographic information associated with the at least one of the user identifier or the device identifier may be collected on at least one of an aggregate basis or an individual basis.

19. The computer-readable storage medium of claim 17, wherein the audience measurement entity is to request the demographic information from a database proprietor using a plurality of at least one of user identifiers or device identifiers associated with the media identifier when the record indicates that the demographic information may be collected on the aggregate basis.

20. The computer-readable storage medium of claim 17, wherein the audience measurement entity is to request the demographic information from a database proprietor using the at least one of the user identifier or the device identifier associated with the media identifier when the record indicates that the demographic information may be collected on the individual basis.

* * * * *